United States Patent
Cordova et al.

(10) Patent No.: US 11,587,368 B2
(45) Date of Patent: *Feb. 21, 2023

(54) METHOD AND SYSTEM FOR ACCIDENT DETECTION USING CONTEXTUAL DATA

(71) Applicant: CAMBRIDGE MOBILE TELEMATICS INC., Cambridge, MA (US)

(72) Inventors: Brad Cordova, Cambridge, MA (US); Rafi Finegold, Sharon, MA (US); Dan Shiebler, Brooklyn, NY (US); Eddie Vaisman, Cambridge, MA (US)

(73) Assignee: CAMBRIDGE MOBILE TELEMATICS INC., Cambridge, MA (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/166,998

(22) Filed: Feb. 3, 2021

(65) Prior Publication Data

US 2021/0264690 A1    Aug. 26, 2021

Related U.S. Application Data

(63) Continuation of application No. 16/054,320, filed on Aug. 3, 2018, now Pat. No. 10,930,090.

(Continued)

(51) Int. Cl.
*G07C 5/00* (2006.01)
*G07C 5/08* (2006.01)
(Continued)

(52) U.S. Cl.
CPC .............. *G07C 5/008* (2013.01); *B60W 40/09* (2013.01); *G06Q 40/08* (2013.01); *G07C 5/0816* (2013.01); *G07C 5/0841* (2013.01); *H04W 4/44* (2018.02)

(58) Field of Classification Search
CPC .... G07C 5/008; G07C 5/0816; G07C 5/0841; B60W 40/09; G06Q 40/08; H04W 4/44
See application file for complete search history.

(56) References Cited

U.S. PATENT DOCUMENTS

| | | | |
|---|---|---|---|
| 8,260,489 B2 * | 9/2012 | Nielsen | G07C 5/085 |
| | | | 701/32.2 |
| 9,275,417 B2 | 3/2016 | Binion et al. | |

(Continued)

FOREIGN PATENT DOCUMENTS

| | | |
|---|---|---|
| JP | 2017087812 A | 5/2017 |
| JP | 2017097477 A | 6/2017 |

(Continued)

OTHER PUBLICATIONS

U.S. Appl. No. 16/054,320, "Final Office Action", dated Sep. 2, 2020, 9 pages.

(Continued)

*Primary Examiner* — Hussein Elchanti
(74) *Attorney, Agent, or Firm* — Kilpatrick Townsend & Stockton LLP

(57) ABSTRACT

A system includes: a mobile device comprising a plurality of sensors; a display device; a memory that stores instructions; and a processor. The processor is configured to execute the instructions to: operate the plurality of sensors over a plurality of time intervals during a trip in a vehicle to collect driving data; detect, using the driving data, a driving event that occurred during the trip and cause the mobile device to collect additional data associated with the trip in response; receive the additional data associated with the trip; determine that a vehicle accident event occurred during the trip based on the driving data and the additional data; and cause the display device to output an indication of the vehicle accident event.

20 Claims, 17 Drawing Sheets

Related U.S. Application Data

(60) Provisional application No. 62/645,653, filed on Mar. 20, 2018, provisional application No. 62/541,615, filed on Aug. 4, 2017.

(51) Int. Cl.
*B60W 40/09* (2012.01)
*G06Q 40/08* (2012.01)
*H04W 4/44* (2018.01)

(56) References Cited

U.S. PATENT DOCUMENTS

| | | | |
|---|---|---|---|
| 9,650,007 | B1 | 5/2017 | Snyder et al. |
| 10,930,090 | B2 * | 2/2021 | Cordova ................. G07C 5/008 |
| 2008/0252485 | A1 | 10/2008 | Lagassey |
| 2013/0124084 | A1 * | 5/2013 | Seo .................... G01C 21/3638 |
| | | | 701/436 |
| 2013/0179198 | A1 * | 7/2013 | Bowne .................... G07C 5/08 |
| | | | 705/4 |
| 2013/0317865 | A1 * | 11/2013 | Tofte ...................... G06Q 10/06 |
| | | | 705/4 |
| 2014/0002651 | A1 * | 1/2014 | Plante ...................... H04N 5/76 |
| | | | 348/148 |
| 2014/0012492 | A1 * | 1/2014 | Bowers .................... G08G 1/16 |
| | | | 701/301 |
| 2014/0046701 | A1 | 2/2014 | Steinberg et al. |
| 2014/0047371 | A1 * | 2/2014 | Palmer ............. H04N 21/47205 |
| | | | 715/771 |
| 2015/0254781 | A1 * | 9/2015 | Binion .................... B60R 21/00 |
| | | | 701/32.2 |
| 2017/0164158 | A1 | 6/2017 | Watkins et al. |
| 2017/0210323 | A1 | 7/2017 | Cordova et al. |
| 2017/0221283 | A1 | 8/2017 | Pal et al. |

FOREIGN PATENT DOCUMENTS

| | | |
|---|---|---|
| JP | 2017116998 A | 6/2017 |
| WO | 2012014972 A1 | 2/2012 |

OTHER PUBLICATIONS

U.S. Appl. No. 16/054,320, "Non-Final Office Action", dated Feb. 25, 2020, 9 pages.
U.S. Appl. No. 16/054,320, "Notice of Allowance", dated Oct. 21, 2020, 5 pages.
EP18841403.1, "Extended European Search Report", dated Mar. 15, 2021, 7 pages.
PCT/US2018/045165, "International Preliminary Report on Patentability", dated Feb. 13, 2020, 8 pages.
PCT/US2018/045165, "International Search Report and Written Opinion", dated Oct. 12, 2018, 9 pages.
JP2020-529109, "Office Action", dated Sep. 9, 2022, 6 pages.
EP18841403.1, "Office Action", dated Dec. 14, 2022, 6 pages.

* cited by examiner

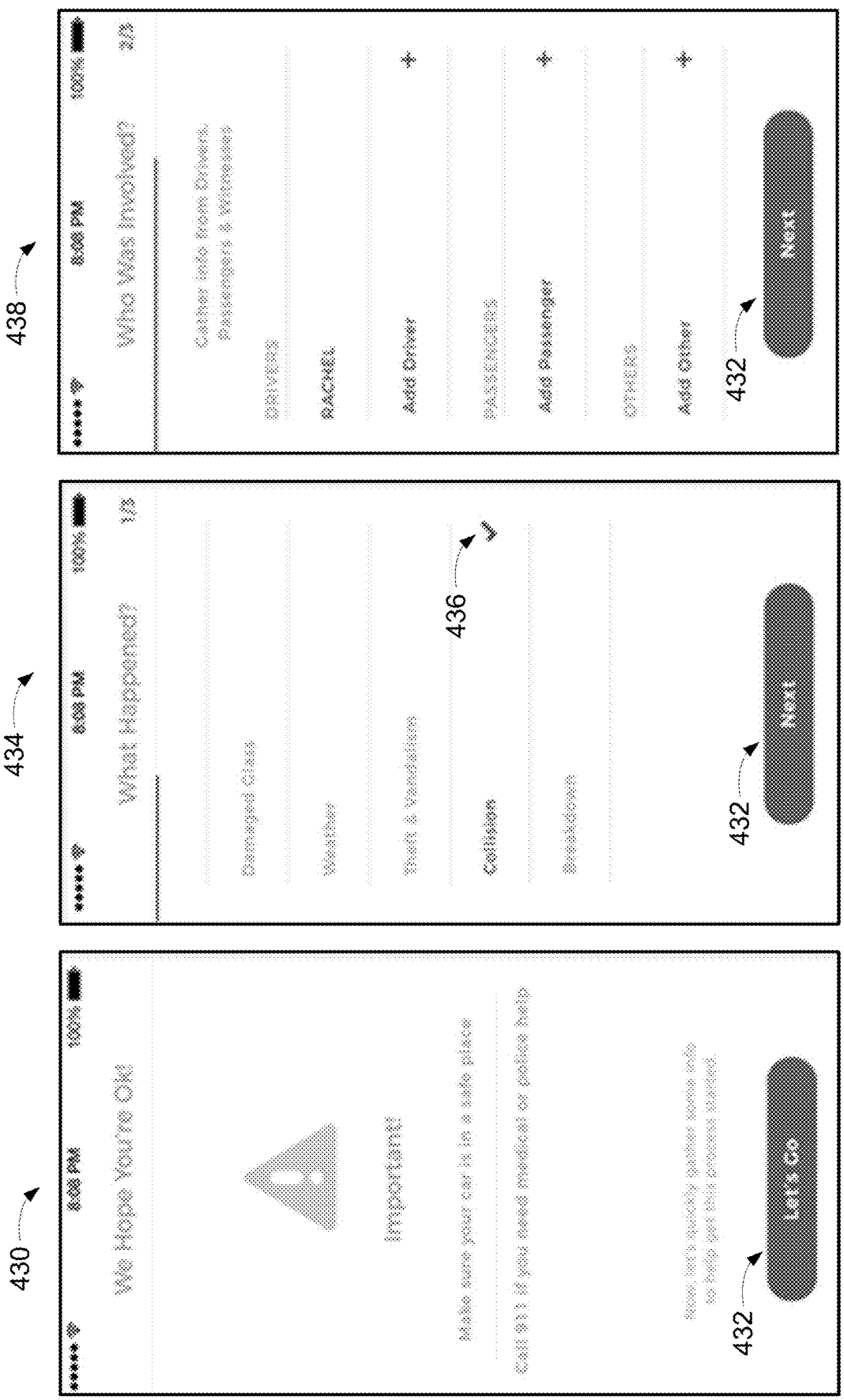

METHOD AND SYSTEM FOR ACCIDENT DETECTION USING CONTEXTUAL DATA

CROSS-REFERENCES TO RELATED APPLICATIONS

This application is a continuation of U.S. patent application Ser. No. 16/054,320, filed Aug. 3, 2018; which claims priority to U.S. Provisional Application No. 62/541,615, filed Aug. 4, 2017, and U.S. Provisional Application No. 62/645,653, filed Mar. 20, 2018, the disclosures of which are hereby incorporated by reference in their entireties.

BACKGROUND OF THE INVENTION

Mobile devices, including smart phones have been utilized to provide location information to users. Mobile devices can use a number of different techniques to produce location data. One example is the use of Global Positioning System (GPS) chipsets, which are now widely available, to produce location information for a device.

Some systems have been developed to track driving behaviors including speed, braking, and turn speed. For example, external devices that plug into an automobile's computer system have been integrated with vehicles to track driving behavior. Despite the progress made in relation to collecting data related to drivers and their driving behavior using external devices and mobile devices, there is need for improved methods and systems related to reporting specific trip driving behavior data associated with vehicle incidents and insurance claims.

SUMMARY OF THE INVENTION

Embodiments described herein relate to transportation systems. Some embodiments relate to the collection and reporting of driving data using, for example, a mobile phone or other network connected computing device. The driving data can include data related to driving behaviors. The driving data and the driving behaviors can be transmitted to a server and made available to a claims adjuster. The driving data and driving behaviors collected and transmitted by a mobile device provide critical accident contextual information to a claims adjustor. This new critical accident contextual information can result in faster claims processing, improved fraud detection, improved fraud prevention, and the like.

According to an aspect of the present disclosure, a method for detecting a vehicle accident with a mobile communication device disposed in the vehicle may be provided. In some aspects, the method may include collecting speed and acceleration data, GPS data, and map information via the mobile communication device; analyzing the collected data via a processor in the mobile communication device; and determining based on analysis results of the data collected by the mobile communication device whether the vehicle was involved in an accident.

The determining whether the vehicle was involved in an accident may include determining whether the vehicle stopped on a roadway for a time exceeding a threshold period of time and/or determining whether irregular acceleration occurred after determining that the vehicle stopped on a roadway while speed data indicates a speed at or near zero mph.

According to an aspect of the present disclosure, a system for detecting a vehicle accident may be provided. In some aspects, the system may include a mobile communication device having a plurality of sensors; a memory; and a processor coupled to the memory, disposed in a vehicle. The processor may be configured to perform operations including receiving data from a global positioning system (GPS); determining based on the received GPS data that the vehicle in which the mobile communication device is disposed stopped at a location on a roadway; determining based on data of a signal from an accelerometer included in the plurality of sensors that an occupant in possession of the mobile communication device exited the vehicle and walked at the location; determining based on the received GPS data that the vehicle resumed moving; and detecting the vehicle accident based on data patterns derived from the received GPS data and the data of the signal from the accelerometer.

The processor may be configured to perform operations including determining, based on the data of the signal from the accelerometer, a length of time the occupant walked; determining, based on the received GPS data, a length of time the vehicle was stopped on the roadway; and determining that a call or text was placed on the mobile communication device. The processor may further be configured to perform operations including detecting a vehicle accident based on the location of the vehicle and an overall data pattern of vehicle stoppage, occupant walking; and/or determining that a call or text was placed on the mobile communication device. The processor may also be configured to perform operations including transmitting the data patterns derived from the received GPS data and the data of the signal from the accelerometer to a server.

According to an aspect of the present disclosure, a method for detecting a vehicle accident with a mobile communication device disposed in a vehicle may be provided. In some aspects, the mobile communication device may include a plurality of sensors, a memory, and a processor coupled to the memory. In some aspects, the processor may be configured to perform operations of the method that may include receiving data from a global positioning system (GPS); determining based on the received GPS data that the vehicle in which the mobile communication device is disposed stopped at a location on a roadway; determining based on data of a signal from an accelerometer included in the plurality of sensors that an occupant in possession of the mobile communication device exited the vehicle and walked at the location; determining based on the received GPS data that the vehicle resumed moving; and detecting the vehicle accident based on data patterns derived from the received GPS data and the data of the signal from the accelerometer.

The processor may be configured to perform operations of the method that may include determining, based on the data of the signal from the accelerometer, a length of time the occupant walked; determining, based on the received GPS data, a length of time the vehicle was stopped on the roadway; and determining that a call or text was placed on the mobile communication device. The processor may further be configured to perform operations including detecting a vehicle accident based on the location of the vehicle and an overall data pattern of vehicle stoppage, occupant walking; and/or determining that a call or text was placed on the mobile communication device. The processor may also be configured to perform operations including transmitting the data patterns derived from the received GPS data and the data of the signal from the accelerometer to a server.

The processor may further be configured to perform operations of the method that may include detecting a vehicle accident based on the location of the vehicle and an overall data pattern of vehicle stoppage, occupant walking; and/or determining that a call or text was placed on the mobile communication device. The processor may also be configured to perform operations of the method that may include transmitting the data patterns derived from the received GPS data and the data of the signal from the accelerometer to a server.

According to an aspect of the present disclosure, a system for reporting accident data may be provided. The system may include: a mobile device having a plurality of sensors; a memory; and a processor coupled to the memory. The processor is configured to perform operations including: operating the plurality of sensors to collect driving data; receiving the driving data collected over a plurality of time intervals from at least one of the plurality of sensors in the mobile device of a user during a trip in a vehicle, assigning the driving data to the trip; receiving input indicating the trip is associated with an accident, wherein the input includes additional data associated with the accident; transmitting the driving data assigned to the trip associated with the accident; and transmitting the additional data associated with the accident.

According to an aspect of the present disclosure, a method for reporting accident data may be provided. In some aspects, the method may include recording driving data by operating a plurality of sensors in a mobile device; receiving the driving data recorded by at least one of the plurality of sensors in the mobile device, where the driving data is associated with a trip; receiving additional data associated with the trip; determining that a subset of the driving data associated with the trip corresponds to the additional data associated with the trip; determining a driving event using at least one of the subset of the driving data or the additional data; and displaying the driving event, the additional data, and the subset of the driving data associated with the trip that corresponds to the additional data associated with the trip.

According to an aspect of the present disclosure, a method for generating an accident report may be provided. In some aspects, the method may include operating a mobile device to obtain driving data from sensors in the mobile device; analyzing, by a processor in the mobile device, the driving data obtained from the sensors; based on the analysis, detecting that an accident occurred; based on the accident detection, automatically generating, by the processor in the mobile device, an accident report; and transmitting the accident report, receiving an accident report submitted by a driver involved in the accident; reanalyzing the driving data in the automatically generated accident report based on the information in the accident report submitted by the driver.

Numerous benefits are achieved by way of the present invention over conventional techniques. For example, embodiments of the present invention provide systems that reduce the amount of time necessary to report and process insurance claims. Some embodiments provide additional data and information with a submitted accident report that enables an adjuster to more accurately analyze events surrounding the accident. These and other embodiments of the invention along with many of its advantages and features are described in more detail in conjunction with the text below and attached figures.

BRIEF DESCRIPTION OF THE DRAWINGS

FIGS. 4A-4G show a graphical user interface for accident driving data reporting according to an embodiment of the invention.

DETAILED DESCRIPTION OF SPECIFIC EMBODIMENTS

Embodiments described herein utilize mobile devices to provide driving data to assist with claims processing, fraud detection, and fraud prevention. For example, a mobile device carried by a user could be used to record driving data associated with a trip, which can be of interest for insurance claims adjustors and the like. As would be appreciated by one having skill in the relevant art(s), given the description herein, a mobile device can be configured to measure driving behaviors using sensors such as the GPS receiver, accelerometer, and gyroscope. By recording and reporting data associated with a trip, claims can be processed faster and fraud detection and prevention can be improved.

As discussed further herein, some embodiments described use approaches to collecting and analyzing driving data similar to the approaches described in U.S. patent application Ser. No. 15/149,603, filed May 9, 2016, entitled "METHODS AND SYSTEMS FOR SENSOR-BASED VEHICLE ACCELERATION DETERMINATION," U.S. patent application Ser. No. 15/149,613, filed May 9, 2016, entitled "METHODS AND SYSTEMS FOR SENSOR-BASED DRIVING DATA COLLECTION," U.S. patent application Ser. No. 14/749,232, filed Jun. 24, 2015, entitled "METHODS AND SYSTEMS FOR ALIGNING A MOBILE DEVICE TO A VEHICLE," U.S. patent application Ser. No. 15/249,967, filed Aug. 29, 2016, entitled "METHODS AND SYSTEMS FOR PRESENTING COLLECTED DRIVING DATA," U.S. patent application Ser. No. 15/866,949, filed Jan. 10, 2018, entitled "METHODS AND SYSTEMS FOR SENSOR-BASED DRIVING DATA COLLECTION," U.S. patent application Ser. No. 15/486,053, filed Apr. 12, 2017, entitled "METHODS AND SYSTEMS FOR ORIENTING A MOBILE DEVICE TO A VEHICLE'S REFERENCE FRAME," U.S. patent application Ser. No. 15/479,991, filed Apr. 5, 2017, entitled "SYSTEMS AND METHODS FOR INDIVIDUALIZED DRIVER PREDICTION," U.S. patent application Ser. No. 15/862,507, filed Jan. 4, 2018, entitled "SYSTEMS AND METHODS FOR DETECTING AIRBAG DEPLOYMENT RESULTING FROM A VEHICLE CRASH," and U.S. patent application Ser. No. 14/268,049, filed Sep. 16, 2016, entitled "SYSTEMS AND METHODS FOR DETECTING AND ASSESSING DISTRACTED DRIVERS," the disclosures of all of which are hereby incorporated by reference herein in their entireties for all purposes (collectively, the "Incorporated Applications"). Specific examples of the use of different embodiments disclosed in the Incorporated Applications are provided herein, although other approaches described in the Incorporated applications may be implemented in conjunction with some embodiments presented herein.

Figure 1:
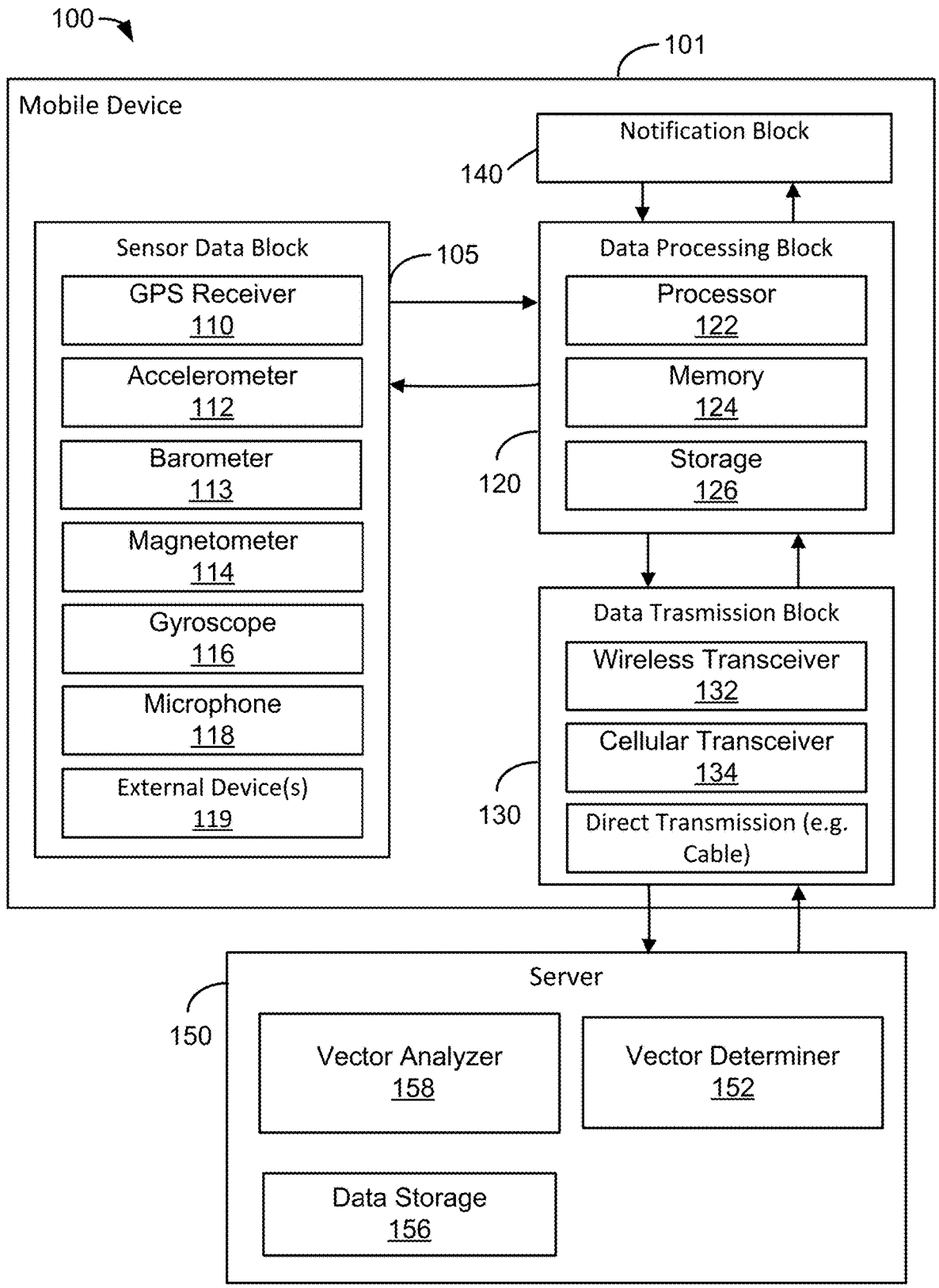
FIG. 1 is a system diagram illustrating a mobile device of an accident driving data reporting system according to an embodiment of the present invention.

FIG. 1 is a system diagram illustrating a system 100 for accident driving data reporting according to an embodiment of the present invention. System 100 includes a mobile device 101 having a number of different components. Mobile device 101 includes a sensor data block 105, a data processing block 120, a data transmission block 130, and a notification block 140. The sensor data block 105 includes data collection sensors as well as data collected from these sensors that are available to mobile device 101. This can include external device(s) 119 connected via Bluetooth, USB cable, etc. The data processing block 120 includes storage 126, and manipulations done to the data obtained from the sensor data block 105 by processor 122. This includes, but is not limited to, analyzing, classifying, characterizing, subsampling, filtering, reformatting, etc. Data transmission block 130 includes any transmission of the data off the phone to an external computing device that can also store and manipulate the data obtained from sensor data block 105. The external computing device can be, for example, a server 150. Server 150 can comprise its own processor 152 and storage 156. In one embodiment, notification block 140 reports the results of analysis of sensor data performed by the data processing block 120 to a user of the mobile device 101 via a display (not shown). The functions of notification block 140 are described further in U.S. patent application Ser. No. 15/413,005, filed Jan. 22, 2016, entitled "SYSTEMS AND METHODS FOR DETECTING AND MODIFYING DRIVING BEHAVIORS," which is herein incorporated by reference in its entirety.

Some embodiments of the present invention are described using examples where driving data is collected using mobile devices 101, and these examples are not limited to any particular mobile device. As examples, a variety of mobile devices including sensors such as accelerometers 112, gyroscopes 116, compasses 119, barometers 113, location determination systems such as global navigation satellite systems, for example, global positioning system (GPS) receivers 110, communications capabilities, magnetometers, and the like are included within the scope of the invention. Exemplary mobile devices include smart watches, fitness monitors, Bluetooth headsets, tablets, laptop computers, smart phones, music players, movement analysis devices, and other suitable devices. One of ordinary skill in the art, given the description herein, would recognize many variations, modifications, and alternatives for the implementation of embodiments.

To collect driving data, one or more sensors on mobile device 101 (e.g., the sensors of sensor data block 105) are operated close in time to a period when mobile device 101 is with a driver when operating a vehicle—also termed herein "a drive" or "a trip". With many mobile devices 101, the sensors used to collect data are components of the mobile device 101, and use power resources available to mobile device 101 components, e.g., mobile device battery power and/or a power source external to mobile device 101.

Some embodiments use settings of a mobile device to enable different functions described herein. For example, in Apple iOS, and/or Android OS, having certain settings enabled can enable certain functions of embodiments. For some embodiments, having location services enabled allows the collection of location information from the mobile device (e.g., collected by global positioning system (GPS) sensors, and enabling background app refresh allows some embodiments to execute in the background, collecting and analyzing driving data even when the application is not executing. For some embodiments, the operating system of mobile device 101 can enable reporting of the screen state of mobile device 101 (i.e., whether the screen is on or off at a particular point in time).

Figure 2:
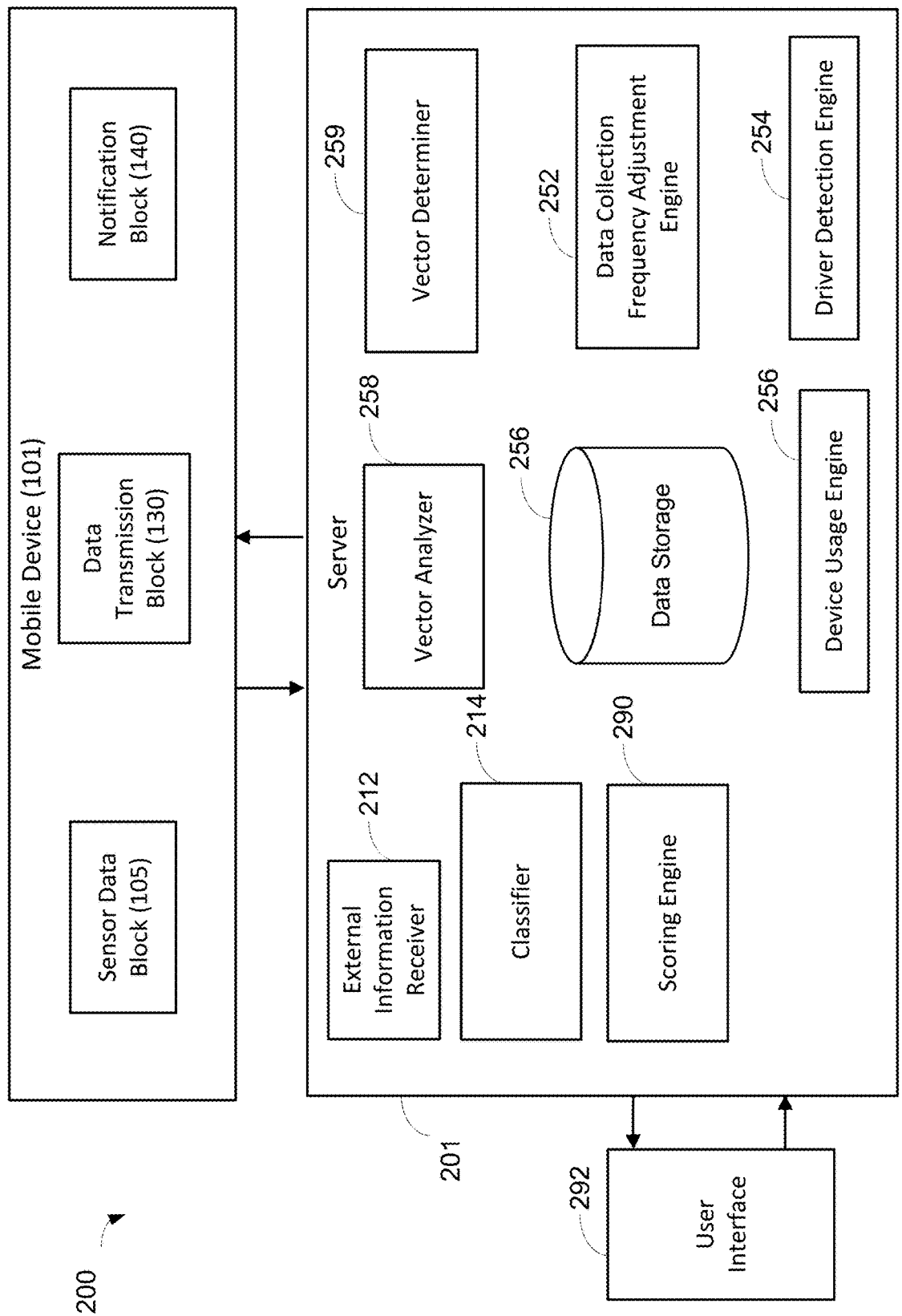
FIG. 2 is a system diagram illustrating a server of an accident driving data reporting system according to an embodiment of the present invention.

FIG. 2 shows a system 200 for accident driving data reporting. In some embodiments, the data can be associated with an insurance claim. The system 200 can include a server 201 that communicates with mobile device 101. In some embodiments, server 201 provides functionality using components including, but not limited to vector analyzer 258, vector determiner 259, external information receiver 212, classifier 214, data collection frequency engine 252, driver detection engine 254, scoring engine 290, and device usage engine 256. These components are executed by processors (not shown) in conjunction with memory (not shown). Server 201 also includes data storage 256. It is important to note that, while not shown, one or more of the components shown operating within server 201 can operate fully or partially within mobile device 101.

To collect driving data, one or more sensors on mobile device 101 (e.g., the sensors of sensor data block 105) are operated close in time to a period when mobile device 101 is with the driver when operating a vehicle—also termed herein "a drive" or "a trip". Once the mobile device sensors have collected data (and/or in real time), some embodiments analyze the data to determine acceleration vectors for the vehicle, as well as different features of the drive. Examples of processes to detect and classify driving features using classifier 214, and determine acceleration vectors using vector analyzer 258 and vector determiner 259. In one embodiment, external data (e.g., weather) can be retrieved and correlated with collected driving data.

In some embodiments, driving data includes when a user interacts with a device. Some embodiments can use the sensor data to estimate when a driver was using the device. Such functions may be performed by device usage engine 256, for example. Examples of collecting driving data using sensors of a mobile device are described herein. Examples of analyzing collected driving data to detect the occurrence of an accident are also described herein. Notifications of driving events can be made via notification block 140 of mobile device 101 in one embodiment. In other embodiments, driving data and notifications may be sent to the user interface 292. The user interface may be used by, for example, a claims adjuster, an insurance provider, or other enterprise business to which the driver authorizes access. The user interface 292 can be located on the same network as server 201. In some embodiments, the user interface can connect to the server 201 using the internet.

Some embodiments analyze collected driving data and assign scores based on different criteria, as discussed further in U.S. patent application Ser. No. 15/413,005 and U.S. patent application Ser. No. 15/615,579, filed Jun. 6, 2017, entitled "SYSTEMS AND METHODS FOR SCORING DRIVING TRIPS," herein incorporated by reference in their entireties. Some embodiments use scoring engine 290 to analyze relevant data and rules, and generate scores for embodiments.

Although shown and described as being contained within server 201, it is contemplated that any or all of the components of server 201 may instead be implemented within mobile device 101, or at the user interface 292. It is further contemplated that any or all of the functionalities described herein may be performed during a drive, in real time, or after a drive.

Figure 3:
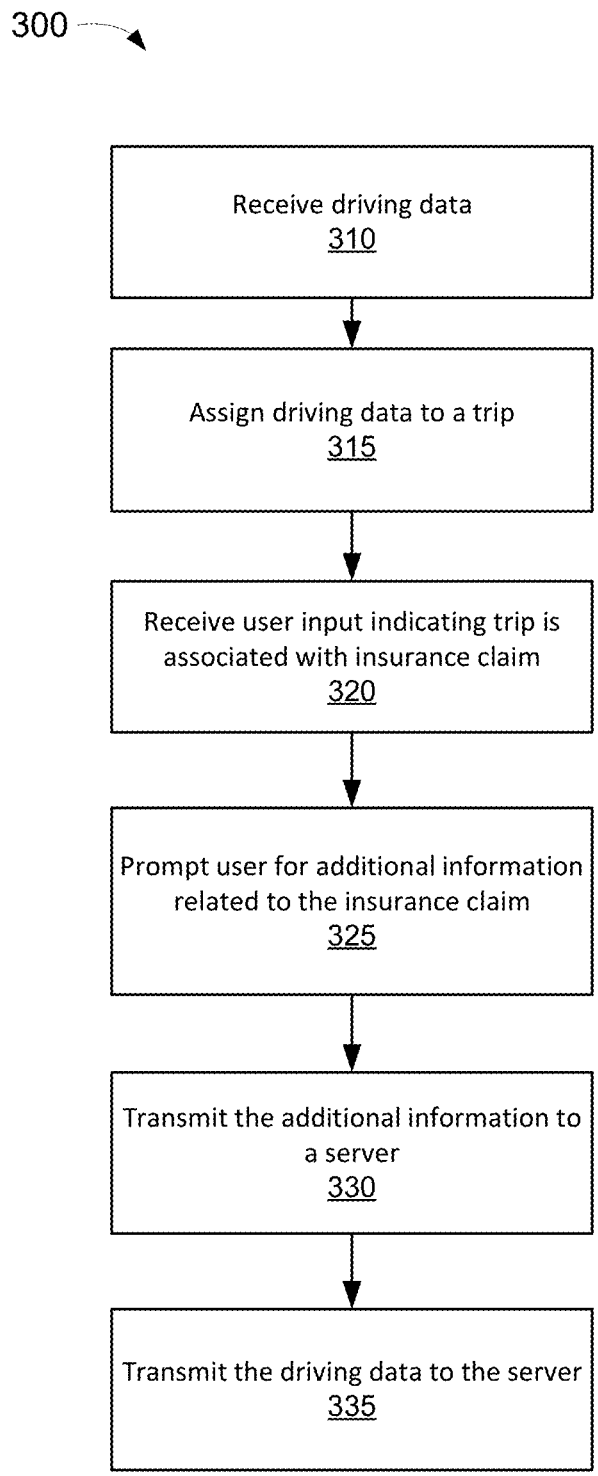
FIG. 3 is a flowchart illustrating the capture, analysis, and use of driving data associated with a trip to file an insurance claim according to an embodiment of the present invention.

FIG. 3 is a flowchart of the capture, analysis and use of driving data associated with a trip corresponding to an insurance claim. The method 300 described in FIG. 3 can use, for example, approaches described in the Incorporated Applications to detect and measure the movement of a mobile device relative to a moving vehicle. The steps may be performed by mobile device 101 and/or server 150 of FIG. 1, or mobile device 101 and/or server 201 of FIG. 2.

As described within the Incorporated Applications, this detection, measurement, and analysis of the movement of a mobile device can be accomplished by collecting and storing sensor data from the mobile device (e.g., from sensors in sensor data block 105), then analyzing the data at server 201 (e.g., using vector analyzer 258, vector determiner 259, and/or classifier 214). In some embodiments, this analysis can additionally or alternatively be performed using resources in the mobile device (e.g., data processing block 120 in mobile device 101).

At block 310, movements are detected, measured, and analyzed by, for example, a mobile device as described in FIG. 1. The movements are detected, measured, and analyzed over a plurality of time intervals. After being measured and analyzed, the data is received as driving data indicating that the data characterizes the movement of a vehicle. In different examples, a measured movement can be minor (e.g., a mobile device sliding sideways within a cup holder), or more substantial (e.g., the mobile device being picked up out of the cup holder and held to the ear of a driver). In some embodiments, minor and more substantial device movements can be included in the driving data because of the relevance of the data to driver attentiveness.

At block 315, driving data can be assigned to a trip. When tracking driver behavior, assigning driving data to a particular trip categorizes the driving data in a manageable format for a user to later analyze and manage. The mobile device can use trip information to categorize driving data for submission to an insurance provider. Trips can be defined using, for example, destination, distances, start/end point identification, date/time groups, etc. One of ordinary skill in the art would recognize many variations, modifications, and alternatives.

At 320, the method includes receiving user input indicating a particular trip is associated with an insurance claim. In some embodiments a user can be presented with a summary of recent trips. A user input can comprise, for example, a swipe or other suitable indication to indicate that the particular trip is associated with an insurance claim. After swiping, the user can then tap the trip to confirm the intent to file an insurance claim. One of ordinary skill in the art would recognize many variations, modifications, and alternatives.

At 325, prompt the user for additional information related to the insurance claim. This additional information can include, for example, the type of insurance claim, a category for the damage, who was involved, license and insurance information, and accident details. The category of damage can include, for example, weather, theft, vandalism, collision, and breakdown. Who was involved can include biographic details and contact information for any witnesses; passengers in the user's vehicle; and, for any other vehicles involved, biographic details and contact information for drivers and passengers and vehicle information. The prompt for the user to enter license and insurance information can include an option to manually enter information or capture the information using a photo. The accident details can include the incident date, the location, a text description of the accident and photos of the accident. In some embodiments, the user may be presented with instructions to move to a safe location and contact medical or police if in need of help prior to entering any additional information. In some embodiments, the user may be presented with an interface to contact emergency personnel.

At 330, the method includes transmitting the additional information related to the insurance claim to a server. In some embodiments the server can be similar to the server described in relation to FIG. 2 configured to process the additional data. In other embodiments, a server can be operated by an insurance provider. In some embodiments, the additional data can be transmitted to another mobile device, for example, the mobile device of another driver.

At 335, the method also includes transmitting the driving data to the server. In some embodiments the server can be similar to the server described in relation to FIG. 2 and a user interface can be used to access the additional data and the driving data. In other embodiments, a server can be operated by an insurance provider. The server operated by an insurance provider can be configured to receive driving data from a user's mobile device or a server similar to the server described in FIG. 2. In some embodiments, the driving data can be transmitted to another mobile device, for example, the mobile device of another driver. Accordingly, in contrast with conventional systems that only provide the insurance provider with the additional information related to the insurance claim, embodiments of the present invention provide the driving data to the insurance provider. As described herein, the provision of the driving data enables analysis of the driving data in conjunction with analysis of the additional data. One of ordinary skill in the art would recognize many variations, modifications, and alternatives.

In some embodiments, the mobile device 101 and/or server 150 of FIG. 1, or mobile device 101 and/or server 201 of FIG. 2 can transmit driving information continuously or at predetermined intervals. In these embodiments, the server receiving the data can be configured to, upon receiving the additional information, determine the driving data that was previously transmitted that corresponds to data in the additional information.

It should be appreciated that the specific steps illustrated in FIG. 3 provide a particular method of receiving driving data and submitting, by trip, the data to a server according to an embodiment of the present invention. Other sequences of steps may also be performed according to alternative embodiments. Moreover, the individual steps illustrated in FIG. 3 may include multiple substeps that may be performed in various sequences as appropriate to the individual step. Furthermore, additional steps may be added or existing steps may be removed depending on the particular applications. One of ordinary skill in the art would recognize many variations, modifications, and alternatives.

Figure 4B:
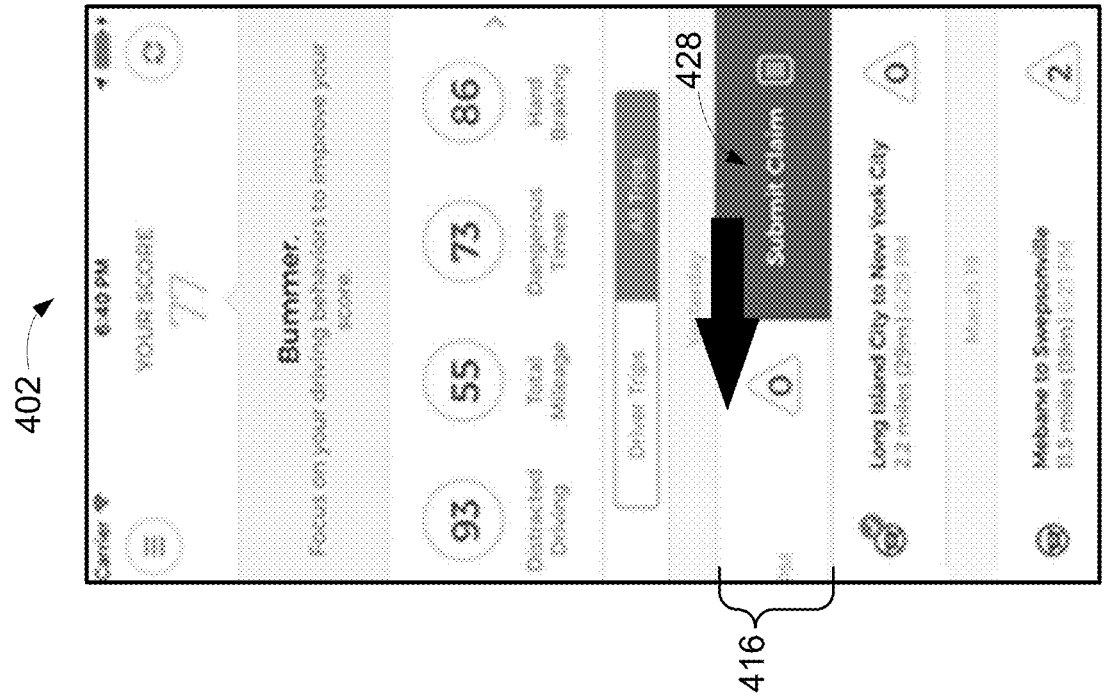
Figure 4A:
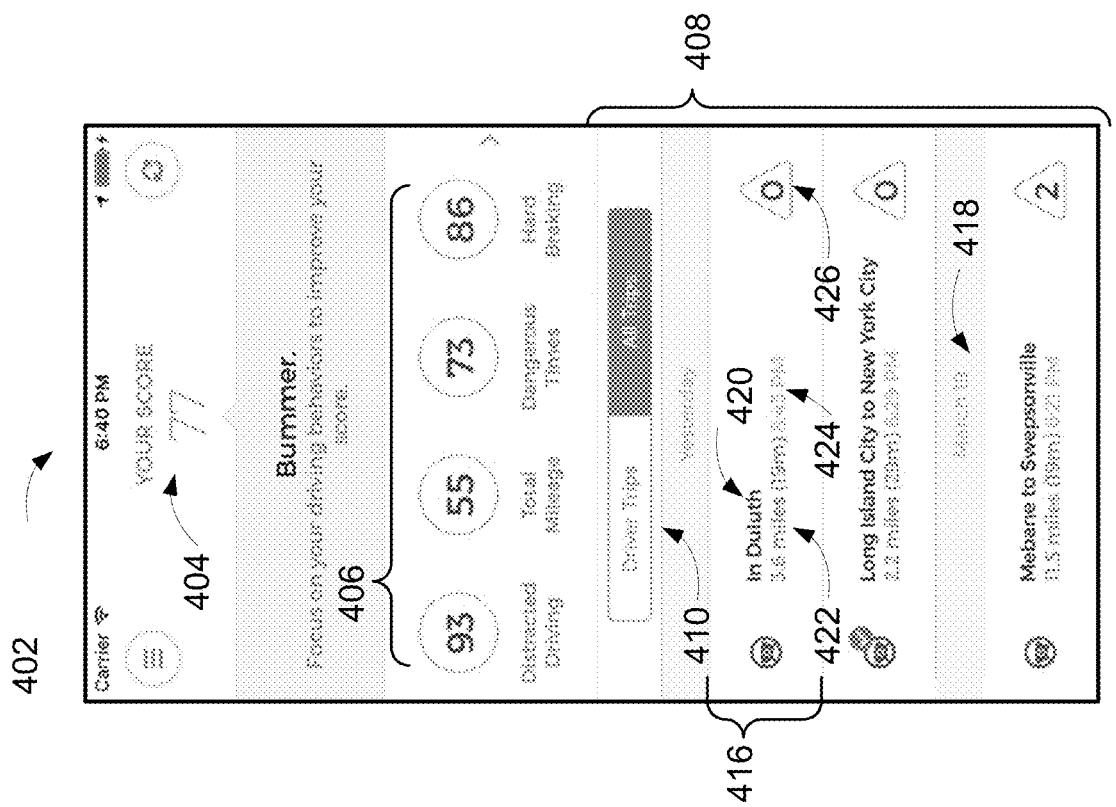

FIGS. 4A-4G are screenshots of a graphical user interface for accident driving data reporting according to an embodiment of the invention. In some embodiments, the graphical user interface may include a summary screen as shown in FIG. 4A. The summary screen 402 can include a driver score display element 404 that corresponds to an analysis of collected driving data by a mobile device or a remote server. The summary screen 402 can include a driving behavior display element 406. The driving behavior display element 406 can include individual criteria used to determine the number in the driver score display element 404.

The summary screen 402 can further include a trips section display element 408. The trips section display element 408 can include a trip driver select element 410 that includes two options, ("driver trips/all trips"). The trip driver select element 410 provides the functionality to filter trips in which the user was not the driver. In some embodiments driving data may be collected when the user is a passenger in the vehicle. The trips section display element 408 can include individual trip elements 416. The individual trip elements 416 can be grouped by date 418. Each individual trip element 416 can include a description 420, for example, city names, a distance 422, a time 424, and a possible event indicator 426. The possible event indicator can be related to driving events identified in the driving data. Driving events can include data related to, for example, braking behaviors, acceleration behaviors, and mobile device usage behaviors that exceed threshold values.

During some trips, an accident may occur. For these trips, the user may desire to submit a claim related to the accident to their insurer. Typically, submission of such claims data includes information related to the accident that is submitted by the driver, for example, the time and date of the accident, driver details, vehicle information (and photos), and accident location. This information, which can be submitted through an app on a mobile device, is typically entered manually by the user. Often, the claims process can be lengthy, starting at the first notice of loss, and continuing through investigation, appraisal, negotiation, settlement, and, if the driver was not at fault, recovery.

Embodiments of the present invention, in addition to information related to an accident provided by the driver, transmit the driving data (e.g., driving data related to trip during which the accident occurred) to the claims adjuster, for example, directly to the claims adjuster or an insurance system server or algorithm. Generally, driving data collected during the trip during which the accident occurred, such as speed or attentiveness, has not been available to a claims adjuster and could not be sent (e.g., immediately) by the insured. The driving data can be used in one or more steps (e.g., each step) of the claims process. At the first notice of loss stage, the driving data can assist with determining location information, drivability, and emergency services. At the investigation stage, the driving data can be used to for fraud detection, liability determination, and low-impact injury assessment. At the appraisal/valuation stage, the driving data provides, for example additional information to assess total loss and damage to impact areas in submitted photos. At the negotiation/settlement stage, the additional driving data can be used to automate the processing of some claims and facilitate a faster, mobile payment of others. Finally, in a multi-party accident, the driving data can enhance accident modeling, assist with liability assessment, and provide legally admissible accident scene data.

FIG. 4B shows a screen shot of the summary screen 402 after an individual trip element 416 is selected by the user. The user can select an individual trip element 416 (i.e., during which an accident occurred) by swiping, tapping, or other suitable input action, combinations thereof, or the like. After initial selection, the summary screen 402 provides, in a particular embodiment, a submit claim display element 428 to the user to confirm the user's intent to submit the trip, and associated driving data for the trip for an insurance claim. One of ordinary skill in the art, given the description herein, would recognize many variations, modifications, and alternatives for the implementation of embodiments.

FIG. 4C shows a warning screen 430. The warning screen 430 is displayed in some embodiments after the user confirms the intent to file a claim. The warning screen 430 typically prompts the user with instructions, for example, "make sure your car is in a safe place" and "call 911 if you need medical or police help." In some embodiments, display elements can be included that the provide the user the capability to call medical or police help directly from the warning screen 430. A confirmation display element 432 can be included to move the user to the next step in the insurance claim process.

FIG. 4D shows a category of damage screen 434. The category of damage screen 434 can include display elements for, for example, weather, theft, vandalism, collision, and breakdown. A selection indicator display element 436 indicates the user's category of damage selection. A confirmation display element 432 can be included to move the user to the next step in the insurance claim process.

FIG. 4E shows a who was involved screen 438. The who was involved screen 438 can include display elements for the entry of biographic details and contact information for any witnesses; passengers in the user's vehicle; and, for any other vehicles involved, biographic details and contact information for drivers and passengers and vehicle information. A confirmation display element 432 can be included to move the user to the next step in the insurance claim process.

Figure 4G:
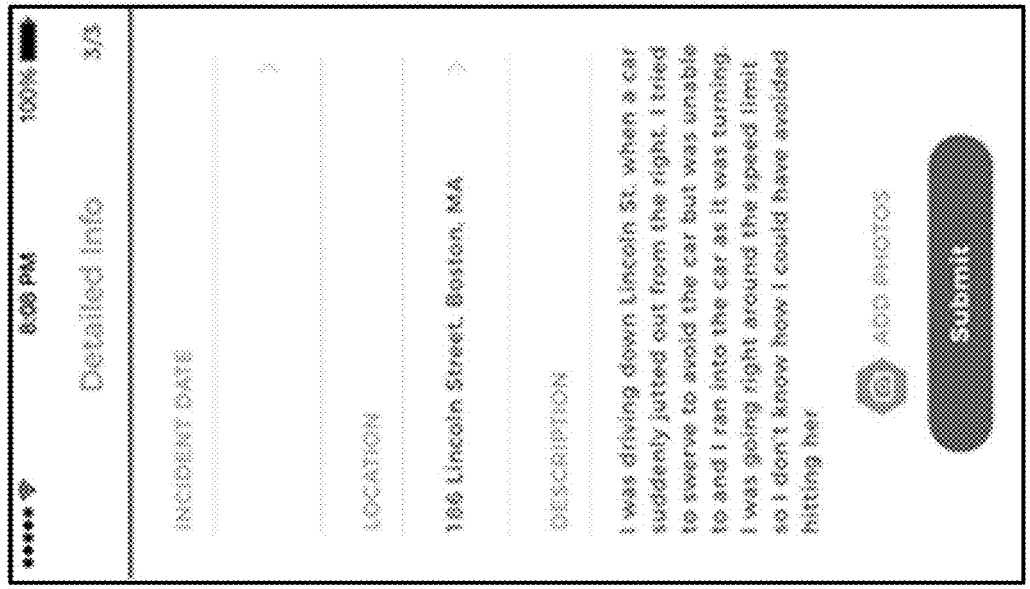
Figure 4F:
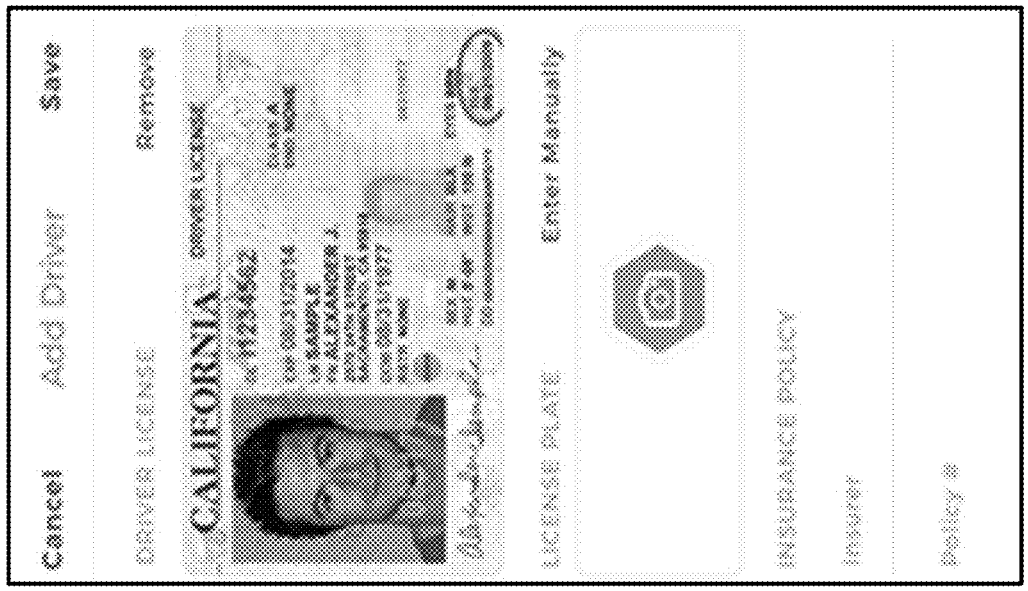

FIG. 4F shows a license and insurance information screen 440. The prompt for the user to enter license and insurance information can include an option to manually enter information or capture the information using a photo. FIG. 4G shows an accident details screen 442. The accident detail screen 442 can include the incident date, the location, a text description of the accident and the capability to add photos of the accident.

Figure 5:
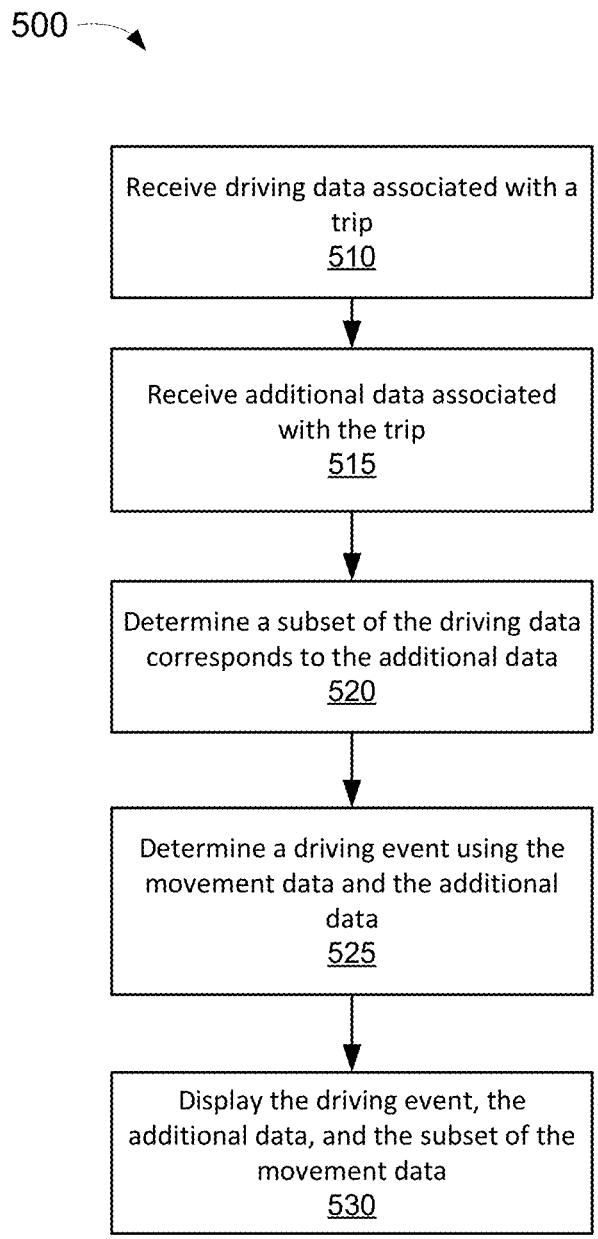
FIG. 5 is a flowchart illustrating the driving data reporting process according to an embodiment of the present invention.

FIG. 5 is a flowchart of the driving data reporting process. The method 500 described in FIG. 5 can be used to expedite claims processing and improve fraud detection. The process can be executed on a server similar to the server described in relation to FIG. 2. In some embodiments, the process can be executed on a server used to process insurance claims. At 510, the method includes receiving driving data associated with a trip. In some embodiments, step 510 may be in response to a mobile device transmitting data for an insurance claim. In other embodiments, a device may continuously submit driving data as described herein.

At 515, the method also includes receiving additional data associated with the trip. The additional data can include an insurance claim and the data discussed in relation to FIGS. 4A-4G. The additional data can be the first notice of loss received by an insurer. In some embodiments, additional data can be received from third parties, for example, weather information, traffic information, road condition information, and additional claims information from other devices. Referring to FIG. 4D, the combination of the driving data associated with the trip and the additional data enables the claims adjustor or suitable claims adjusting algorithms to enhance the claim adjustment process. As an example, if the category of damage is input as collision, but the driving data indicates that no substantial accelerations were measured during the trip, it is unlikely that a collision actually occurred during the trip, providing an indication of potential fraud.

At 520, the method includes determining that a subset of the driving data corresponds to the additional data. Whether the driving data is continuously received or received on a trip by trip basis, the driving data of interest when determining an insurance claim will be a subset of the data received. In some embodiments, at 520, the driving data can be sliced to discard portions not associated with trip that correspond to the insurance claim. In other embodiments, driving data from previous trips may be used to identify a driver's tendencies at a particular location or under particular conditions. The driving data relevant to the additional data is determined and analyzed for driving behaviors indicative of the category of damage in the insurance claim.

At 525, the method further includes determining a driving event using the driving data and the additional data. A driving event can be any driving behavior that departs from a nominal or average value. Driving behaviors can include any driving behaviors, such as braking behaviors, acceleration behaviors, speeding behaviors, and the like. For example, data from an accelerometer indicating rapid deceleration (e.g., deceleration greater in magnitude than a threshold) may be correlated to a hard braking event indicative of braking behavior. In another example, data from an accelerometer indicating rapid acceleration (e.g., acceleration greater in magnitude than a threshold) may be correlated to a rapid acceleration event indicative of acceleration behavior.

In addition, mobile device usage behaviors, also referred to herein as "distracted driving behaviors" (see, for example, Incorporated application Ser. No. 14/268,049) may be determined. In some embodiments, movement measurements of the mobile device may be analyzed to determine whether they are indicative of a particular type of event (e.g., driver inattentiveness). The particular type of event, for example, but not limited to, holding the mobile device to the ear or in a position to be viewed, interacting with the mobile device, etc., may be associated with use by the driver of the mobile device such that the driver of the vehicle is potentially not paying attention to driving tasks (e.g., the driver is distracted from driving tasks by mobile device). As another example, data from an accelerometer indicating movement, interaction, or manipulation of the mobile device by the user within the vehicle during a drive may be used to calculate a mobile device usage percentage (e.g., the percentage of the trip in the vehicle during which the user is interacting with the device) indicative of mobile device usage behavior.

In addition to driving behavior, driving events can include, for example, accident indicators and start/finish trip indicators. An accident indicator may appear in the data when, for example, the accelerometer indicates a rapid deceleration that exceeds values seen even during a hard breaking event. One of ordinary skill in the art, given the description herein, would recognize many variations, modifications, and alternatives for the implementation of embodiments.

As an example, by utilizing both the additional data and the driving data, analyses can be performed that are not available using conventional techniques. For example, the driving data can be analyzed to determine if a driver was texting in the time preceding the occurrence of the accident. Additionally, if the driver reports that the accident occurred because of failure of another vehicle to yield, however, the acceleration associated with the accident occurred on a freeway a significant distance from an on ramp or off ramp, this may indicate a discrepancy between the driver's report and the driving data. As another example, if the driving data indicates a low speed impact, a driver's report of severe injury may be questioned.

At 530, the method includes displaying the driving event, the additional data, and the subset of the driving data 530. The display can be accessed by a user or an insurance provider. For example, a claims adjuster may access the driving data and additional data using the user interface 292 identified in FIG. 2. It should be appreciated that the specific steps illustrated in FIG. 5 provide a particular method of receiving driving data, determining driving events, and displaying the driving events, the driving data, and additional information. Other sequences of steps may also be performed according to alternative embodiments. Moreover, the individual steps illustrated in FIG. 5 may include multiple substeps that may be performed in various sequences as appropriate to the individual step. Furthermore, additional steps may be added or existing steps may be removed depending on the particular applications. One of ordinary skill in the art would recognize many variations, modifications, and alternatives.

FIGS. 6A-6G illustrate an embodiment of a graphical user interface (GUI) for a claims adjuster used to display the driving event, the additional data, and the subset of driving data, providing manageable access to the volume of driving data that can be received. The claims adjuster may receive a claim for loss and initiate an investigation. With access to the driving data, the claims adjuster can verify accuracy of the location of the claim and make a preliminary liability determination based on the driving behavior and driving events identified from the driving data. The driving data also provides crash context to enable the adjuster to judge the claims of third parties. Using the information presented in the user interface based on the available driving data, the claims adjuster will be able to pay claims and detect fraud with greater accuracy and speed, described in detail below.

In some embodiments, the system may determine a liability recommendation based on the driving data and provide a recommendation to the adjuster. In other embodiments, the system may use the driving data to determine a score for the incident similar to the determination of the driver score and automatically process the claim and execute payment of the claim based on the scores relation to a threshold value.

Figure 6A:
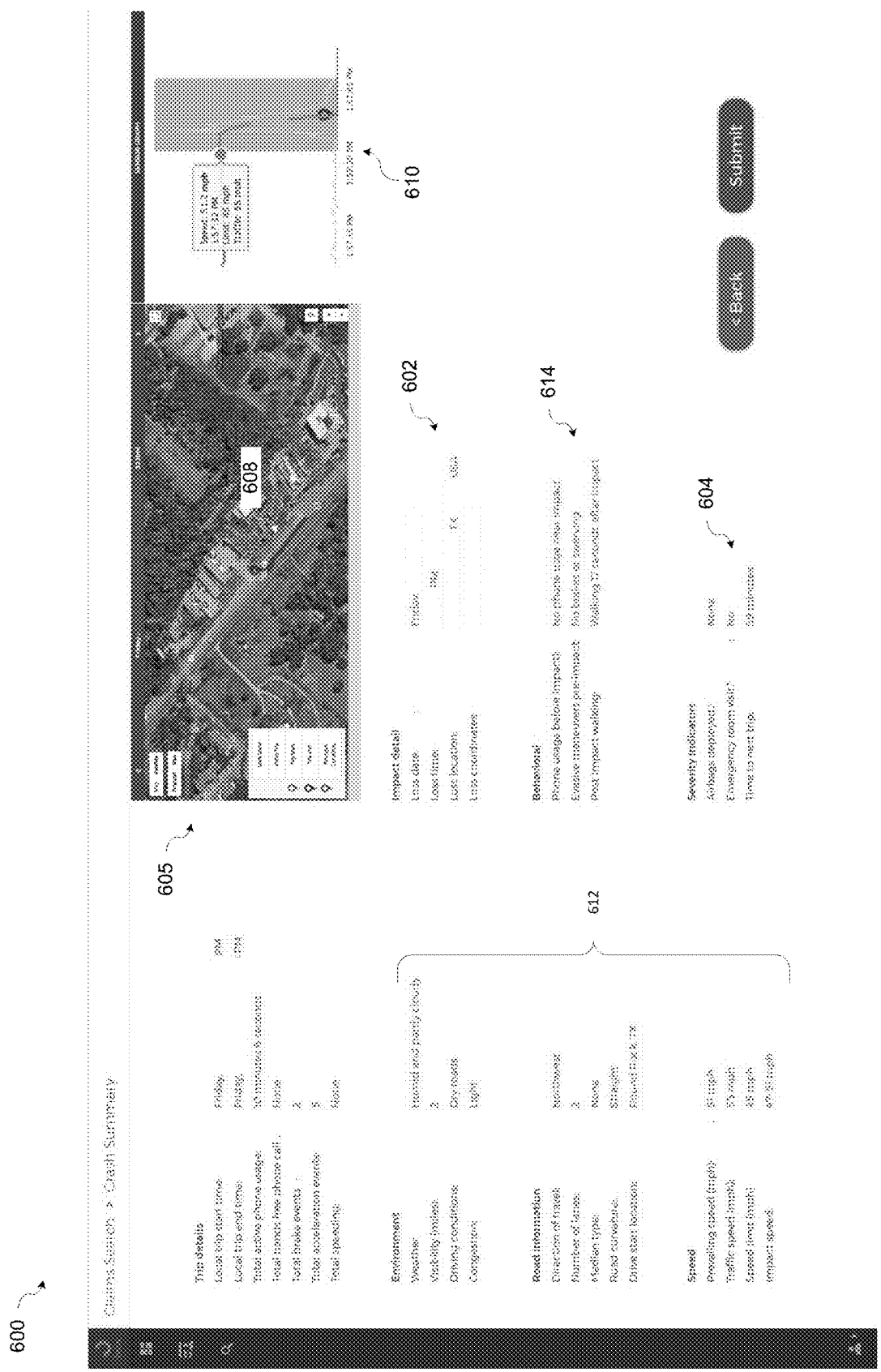
FIGS. 6A-6G show an embodiment of a graphical user interface used to display a driving event, additional data, and a subset of driving data.

Referring to FIG. 6A, a crash summary page 600 displayed on the GUI may provide an overview of the circumstances related to an insurance claim. The crash summary page 600 may include display elements to highlight relevant accident data, for example, a time of incident display element 602, and an incident severity display element 604 including an airbag deployed display element (which, for example, can be detected by phones with high frequency barometers). The crash summary page 600 may also display environmental and roadway information 612 as well as vehicle speed and information related to driver behavior 612.

Map data 605 may be pictorially displayed on the crash summary page 600. An area 608 where the accident related to the claim occurred may be shown highlighted on the map. An annotated graph 610 illustrating sensor data, for example, vehicle speed, acceleration, etc., around the time of the accident may also be displayed. The annotations may include, for example, but not limited to, vehicle speed, average traffic speed, speed limit, etc. One of ordinary skill in the art will appreciate that the illustrated sensor data and annotations are exemplary and that different or additional sensor data and/or annotations may be displayed without departing from the scope of the present disclosure.

One of ordinary skill in the art will appreciate that the information displayed on the crash summary page 600 is merely exemplary and that more or less information and/or different information may be displayed without departing from the scope of the present disclosure. A claim may be submitted for processing from the crash summary page 600.

Figure 6B:
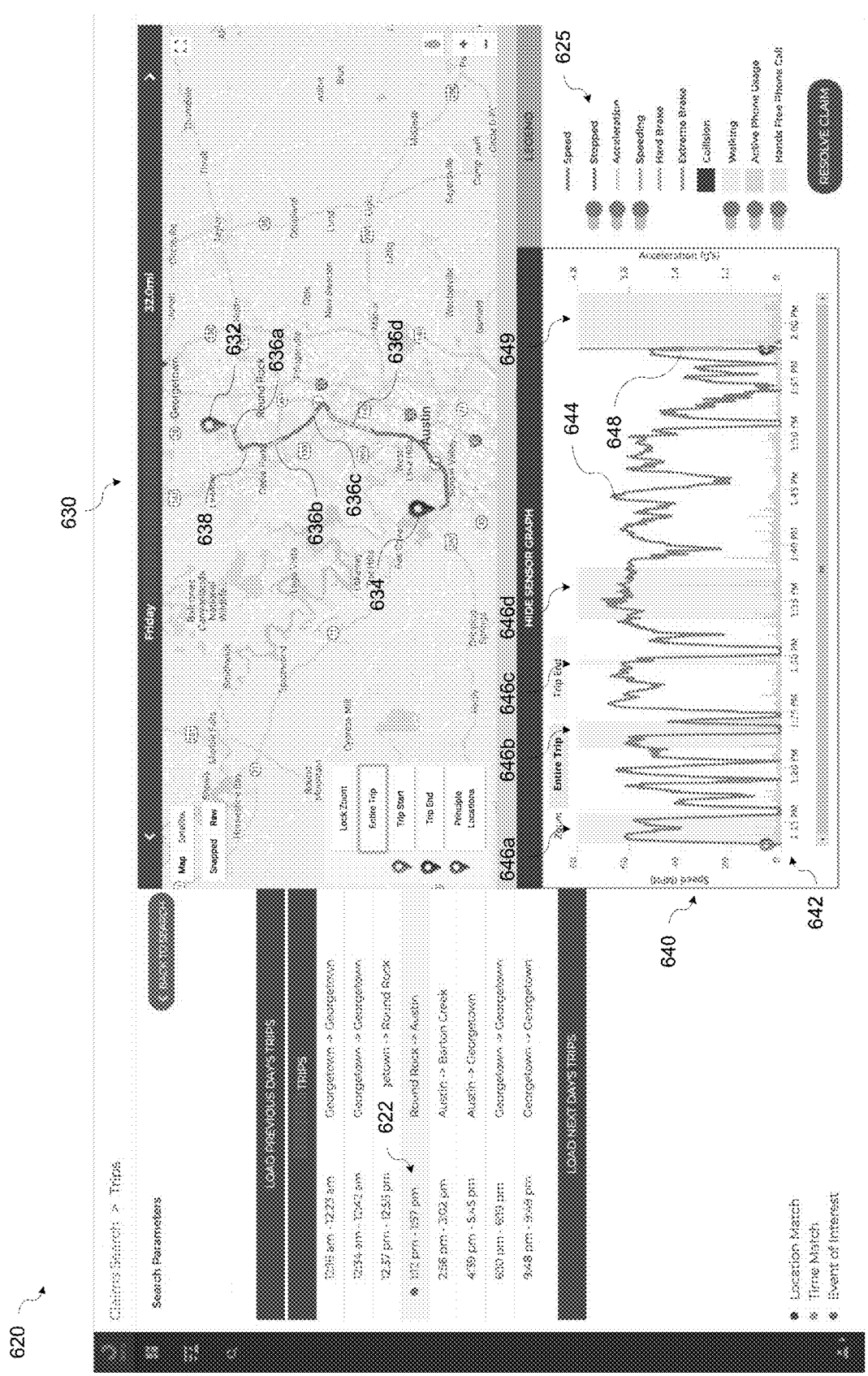

FIG. 6B illustrates a trip overview page 620 displayed on the GUI according to various aspects of the present disclosure. Using the GUI, an adjuster may search for a particular trip recorded by the mobile device to perform further analysis of a claim based on the recorded driving data. Driving events identified by the system may be determined by any system running the user interface and receiving the driving data, by the server interfacing with the user's mobile device, and the user's mobile device. The driving events the system may identify include, for example, but not limited to, possible crashes, airbag deployment, braking events, acceleration events, mobile device usage events, speeding events, etc. One of ordinary skill in the art will appreciate that other driving events may be identified without departing from the scope of the present disclosure.

Referring to FIG. 6B, the trip overview page 620 may include an overview map 630, a data graph 640, and a legend 625. The legend 625 may provide identification of various indicators and/or events displayed on the overview map 630 and the data graph 640 and may provide means to enable or disable display of the various events and/or indicators. The trip overview page 620 may indicate, for example, by highlight, a trip identifier 622 for the trip information being displayed.

The overview map 630 may display an overview of the route taken during the trip corresponding to the trip identifier 622. The overview map 630 may indicate a starting point 632 and an ending point 634 for the trip. The overview map 630 may indicate various events that were sensed by the mobile device along the route, for example, but not limited to, periods of active cell phone usage 636a-636d, and a hard or extreme braking event 636. The hard or extreme braking event 636 may be detected and interpreted as an accident. One of ordinary skill in the art will appreciate that these event indicators are merely exemplary and that more or fewer event indicators and/or different event indicators may be displayed on the overview map 630 without departing from the scope of the present disclosure.

The data graph 640 illustrates sensor data from the sensors of the mobile device. A timeline 642 relates the sensed vehicle speed 644 to the time of the identified trip. Also illustrated on the data graph 640 are periods of active cell phone usage 646a-666d corresponding to the periods of active cell phone usage 636a-636d on the overview map 630. Also illustrated on the data graph 640 is the hard or extreme braking event 648 corresponding to the hard or extreme braking event 638 displayed on the overview map 630. In addition, the data graph 640 illustrates sensor data, for example, acceleration sensor data 649, that may indicate that a user holding the mobile device walked around after experiencing the hard or extreme braking event 648, providing another indication that an accident may have occurred. Non-driving behaviors such as walking around after an incident is detected may assist a claims adjuster with liability assessment. One of ordinary skill in the art will appreciate that sensor data and events illustrated on the data graph 640 are merely exemplary and that more or fewer sensor data plots and/or event indicators and/or different event indicators may be illustrated on the data graph 640 without departing from the scope of the present disclosure.

Figure 6C:
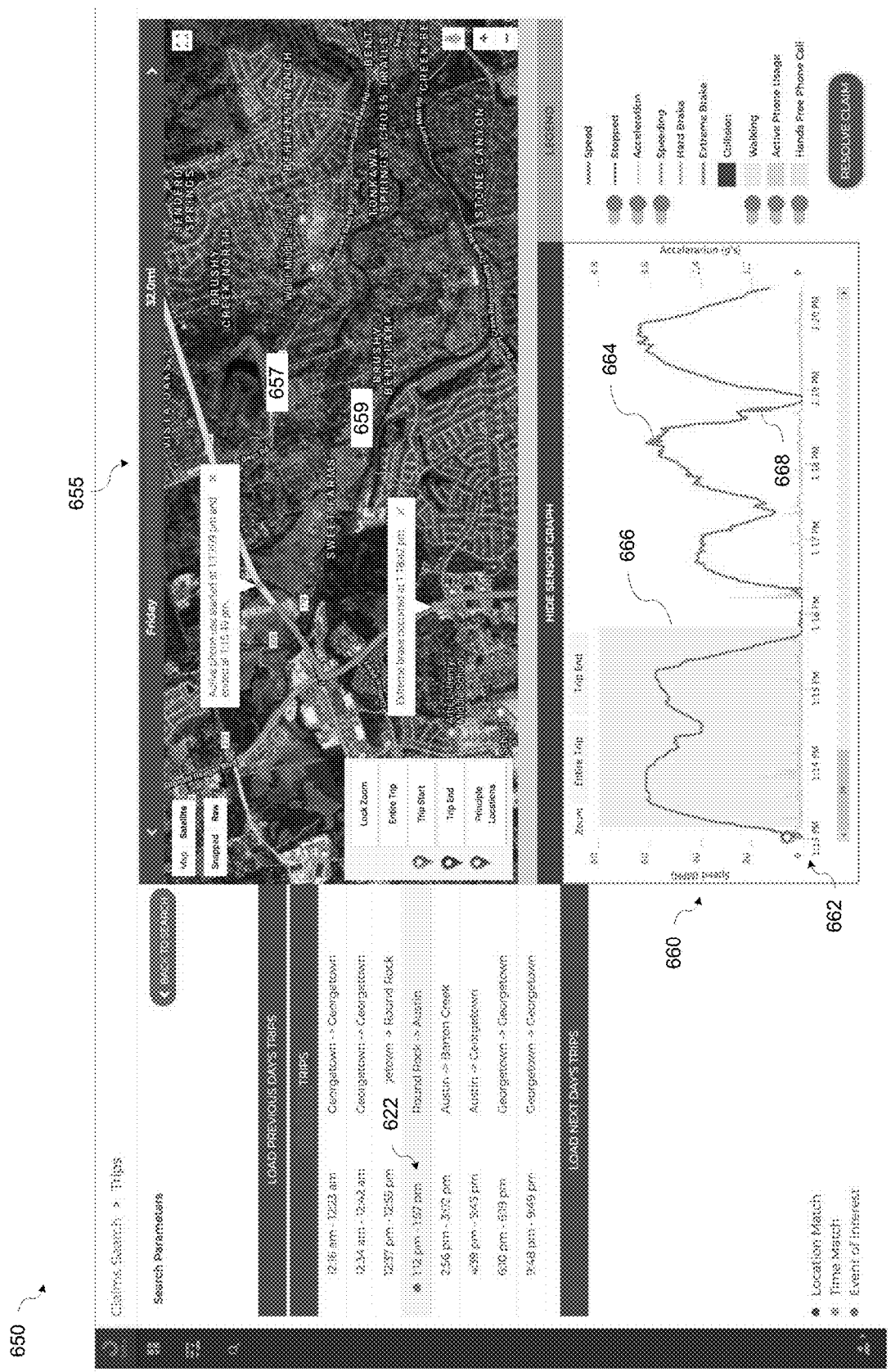

FIG. 6C shows a zoomed-in view 650 of the trip overview page 620. The zoomed-in view 650 may include a zoomed-in portion 655 of the of the overview map 630 related to a subset of driving data selected by the adjuster. The zoomed-in portion of the map 655 may display annotations 657, 659 of events detected by the sensors of the mobile device as well as the time the events occurred. For example, as illustrated in FIG. 6C, a first annotation 657 indicating active phone use corresponding to the active phone use 636a displayed on the overview map 630 and a second annotation 659 indicating an extreme braking event corresponding to the extreme braking event 638 displayed on the overview map 630 may be displayed. The annotations of various events may be automatically generated by the system when a zoomed-in portion of the map includes an event. Alternatively, the annotations may be generated by selecting a point on the route on the GUI, or annotations on the zoomed-in portion 655 may be manually entered.

When the adjuster zooms in on a portion of the overview map 630, the corresponding portion of the data graph 640 may also be zoomed in. As illustrated in FIG. 6C, a zoomed-in view 660 of the data graph 640 corresponding to the zoomed-in portion of the map 655 may be displayed. The zoomed-in view 660 of the data graph 640 may display the corresponding timeline 662 and vehicle speed 664, as well as the sensed events (i.e., active cell phone usage 666 and extreme braking event 668) that occurred during the time indicated on the timeline 662 of the zoomed-in view 660 of the data graph 640. Annotations (not shown) on the zoomed-in view 660 of the data graph 640 of various events may be automatically generated by the system when a zoomed-in portion of the map includes an event. Alternatively, the annotations may be generated by selecting a point on the route on the GUI, or annotations on the zoomed-in view 660 may be manually entered.

Different events that may occur during the drive may be defined based on components of the driving data. For example, time periods during which the driver is texting, talking on the phone, playing video on the phone, etc., may be overlaid on the other temporal driving data, including, for example, but not limited to, speed, acceleration, etc., for review by algorithms or by the claims adjuster.

One of ordinary skill in the art will appreciate that sensor data and events illustrated on the zoomed-in view 660 of the data graph 640 are merely exemplary and that more or fewer sensor data plots and/or event indicators and/or different event indicators may be illustrated on the data graph 640 without departing from the scope of the present disclosure.

Figure 6D:
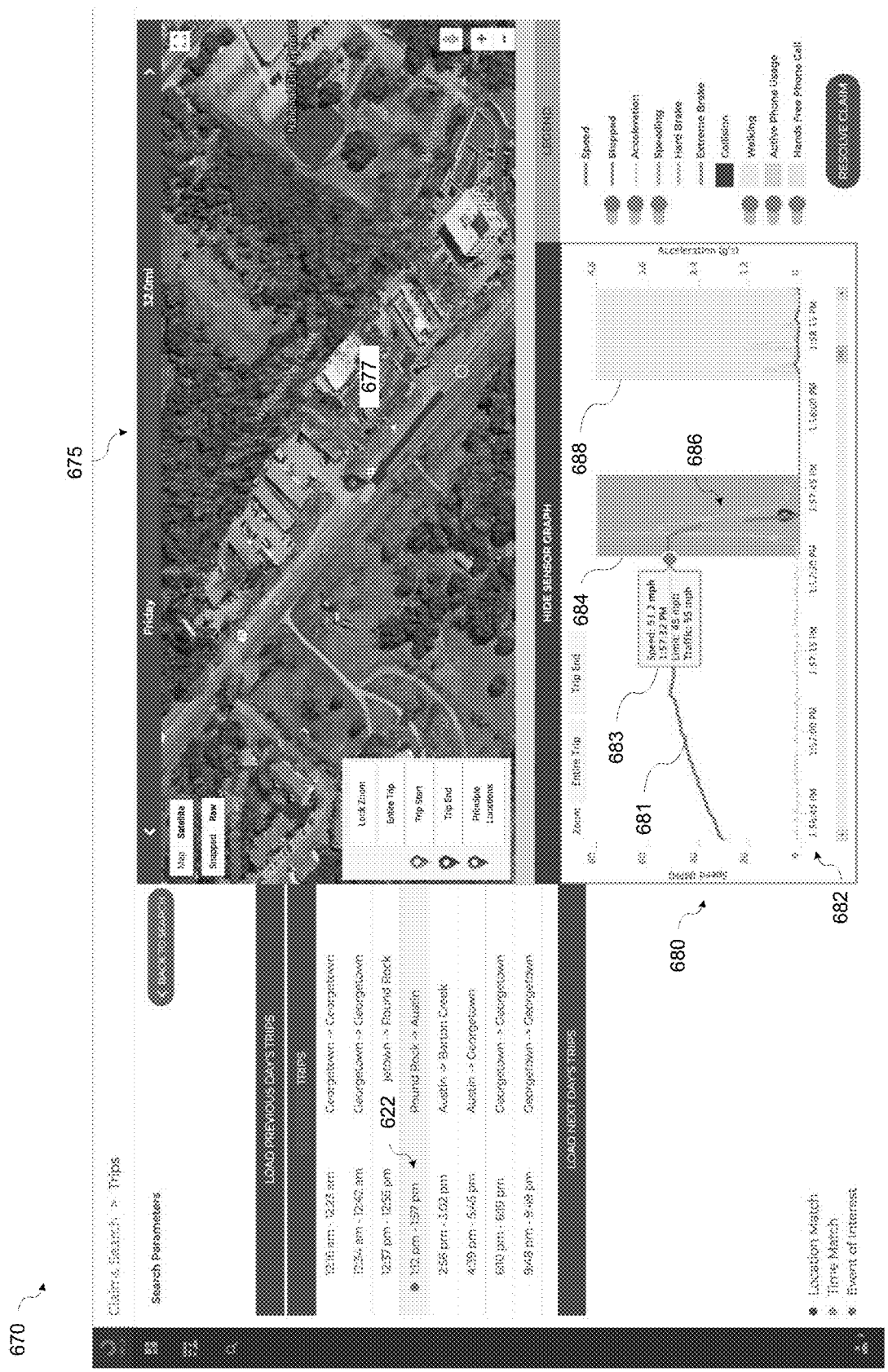

FIG. 6D shows a zoomed-in view 670 of the trip overview page 620 including a subset of driving data corresponding to an indicated event. The zoomed-in view 670 may include a zoomed-in portion 675 of the of the overview map 630 related to a subset of driving data selected by the adjuster for further analysis of the event. As illustrated in FIG. 6D, the zoomed in portion 675 may include an indication, for example, a highlighted section 677 indicating the area on the map where the event occurred. Annotations (not shown) on the zoomed-in portion 675 corresponding to events may be automatically generated and/or may be generated by selecting a point on the zoomed-in portion 675 of the map and/or by manually entering the annotations.

When the adjuster zooms in on a portion of the overview map 630, the corresponding portion of the data graph 640 may also be zoomed in. As illustrated in FIG. 6D, a zoomed-in view 680 of the data graph 640 corresponding to the zoomed-in portion of the map 675 may be displayed. The zoomed-in view 680 of the data graph 640 may display the corresponding expanded timeline 682 and a plot of the vehicle speed 681 corresponding to the timeline. Annotations 683 corresponding to events may be automatically generated and/or may be generated by selecting a point on the zoomed-in view 680 and/or by manually entering the annotations. The zoomed-in view 680 of the data graph 640 may provide indications of detected events. For example, the zoomed-in view 680 of the data graph 640 may provide an indicator 684 corresponding to the highlighted section 677 of the area on the map where the event occurred. The example of FIG. 6D shows sensor data of an extreme braking event 686 within the event indicator 684 as well as an indicator 688 provides manageable access to the volume of driving data that can be received of a user holding the mobile device walked around after experiencing the hard or extreme braking event 686.

Figure 6E:
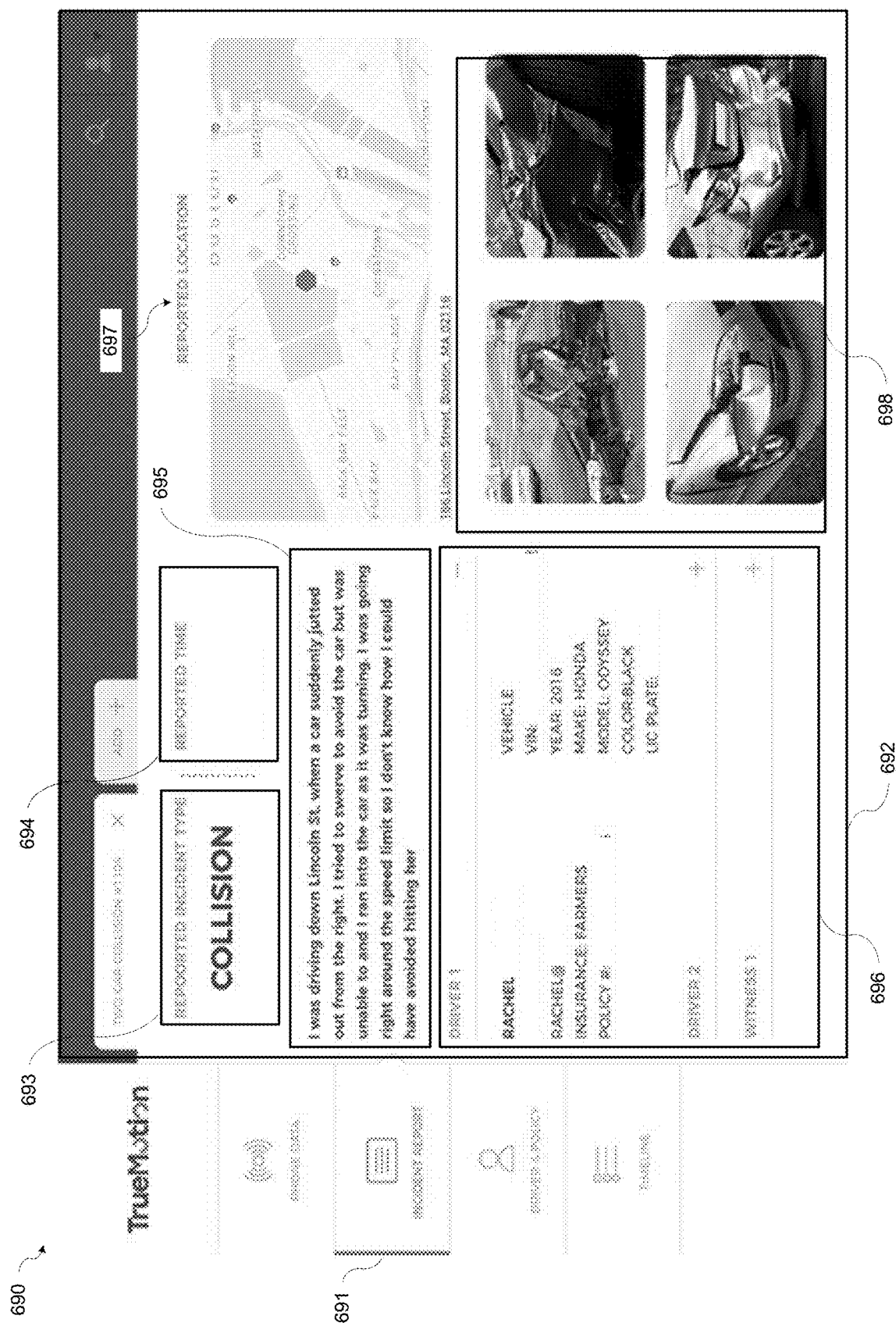

FIG. 6E shows an incident report display element 690. The incident report display element 690 may include display elements to highlight relevant accident data, for example, a category of damage display element 693, a reported time display element 694, a user description of the incident display element 695, a parties involved display element 696, a reported location element 697, and a photos of the incident element 698.

In accordance with various aspects of the present disclosure, the mobile device may provide a reminder or prompt to the driver at the time of the accident to take photographs of the damage. The mobile device may transmit the photographs together with a timestamp and GPS data identifying the time and location where the photographs were taken. When taken at the scene of the accident, the timestamp and GPS data may provide additional corroboration of the damage sustained at the time of the accident.

Figure 6F:
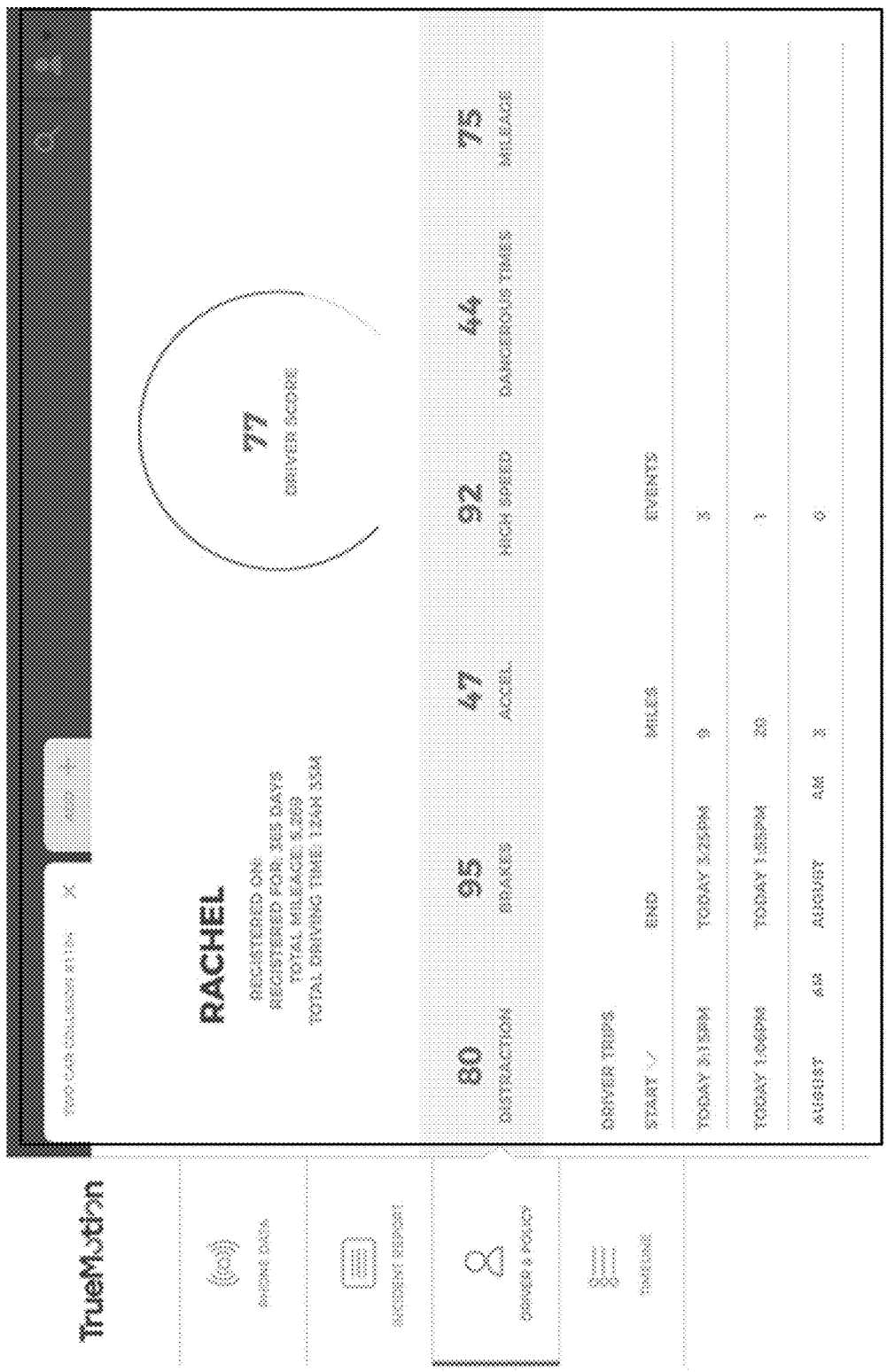

FIG. 6F shows a driver and policy display element 6000. The driver and policy display element 6000 displays additional information to assist the a claims adjuster with appraisal, valuation, negotiation, and settlement of the claim. In some embodiments, when a claim is submitted the claim may be appended with a distracted driving score and/or other information from the driver and policy display element 6000.

Figure 6G:
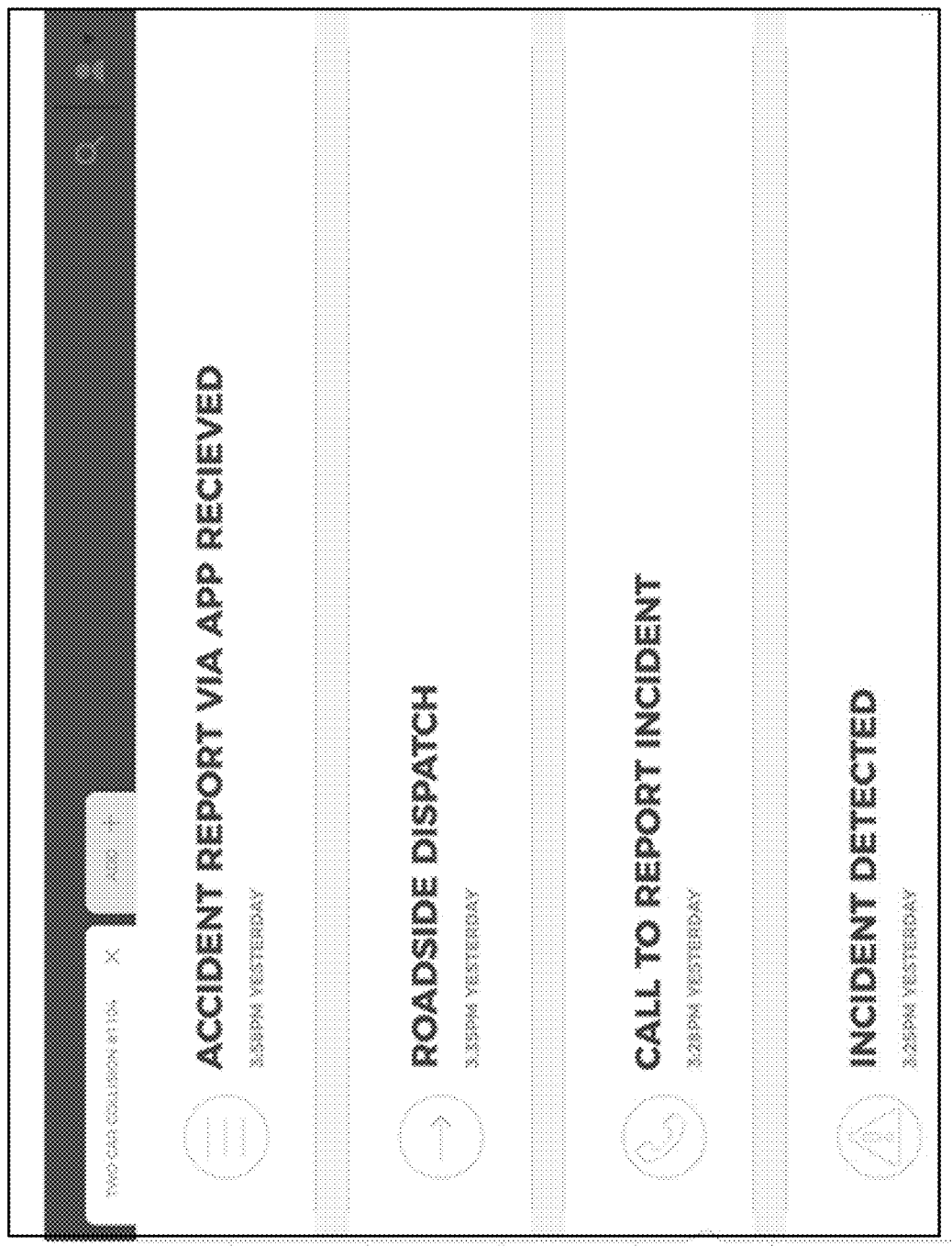

FIG. 6G shows a timeline display element 6010. The timeline display element 6010 may track the events associated with first notice of loss, investigation, appraisal, negotiation, settlement, and recovery.

In accordance with various aspects of the present disclosure, in addition to transmitting measurement data obtained by the sensors, the mobile device may transmit processed data (i.e., data generated by processing the obtained measurement data), for example, but not limited to, distracted driving data, and contextual data (i.e., data obtained from one or more third party databases), for example, but not limited to, weather data, traffic data, etc., to the server for access by an insurance adjuster.

Contextual data provided by one or more sensors of a mobile communication device (e.g., the mobile device 101) traveling with an occupant of a vehicle in combination with GPS data and/or map information (e.g., map information provided by a third party) received by the mobile device 101 may be used to determine the likelihood of a vehicle accident. For example, indicators such as stopping the vehicle and/or walking around in an unusual location (e.g., a highway), making phone call while stopped and/or walking on the side of the road, stopping on a roadway for an extended period of time (e.g., 10 or more minutes) then continuing a drive may be detected. Other indicators, for example but not limited to, a trip to a hospital or an auto body shop after an unusual event may be detected. In addition, other events, for example but not limited to, spinning out of control (i.e., multiple 360° turns) and/or a large impact while stopped on a roadway may be detected.

Thus, even without detecting an acute braking event, for example, but not limited to detecting a sharp deceleration or sharp decrease in speed, the contextual data and information provided by the sensor data, GPS data, and/or map information may be used to determine that an accident has occurred.

Accident reports submitted by a driver subsequent to an accident often include approximations of the time and location of the accident. These approximations make it impractical for an adjuster to consult third-party databases for additional information such as location and traffic information while investigating an accident. According to aspects of the present disclosure, the contextual data may be transmitted to the server together with a timestamp indicating the time the event occurred. Providing a timestamp with the contextual data may enable an adjuster to correlate conditions surrounding an accident with the precise time and location of the accident during an accident investigation.

In addition to the graphical presentation of the driving data as illustrated in FIG. 6A-6E, aspects of the present disclosure may provide textual summaries of the driving data. Base on analysis and interpretation of the driving data, including processed data and contextual data, by the mobile device or server, a narrative timeline of events around the time of the detected or reported accident may be generated. In some embodiments, the textual narrative may be automatically generated that describes the events and conditions within a timeframe, for example, from five minutes before until five minutes after a crash is automatically detected, or another time frame. In some embodiments, a timeframe for generating the narrative may be specified by an adjuster reviewing the received driving data. In accordance with various aspects of the present disclosure, a graphical timeline representation of the events may be generated.

Figure 7A:
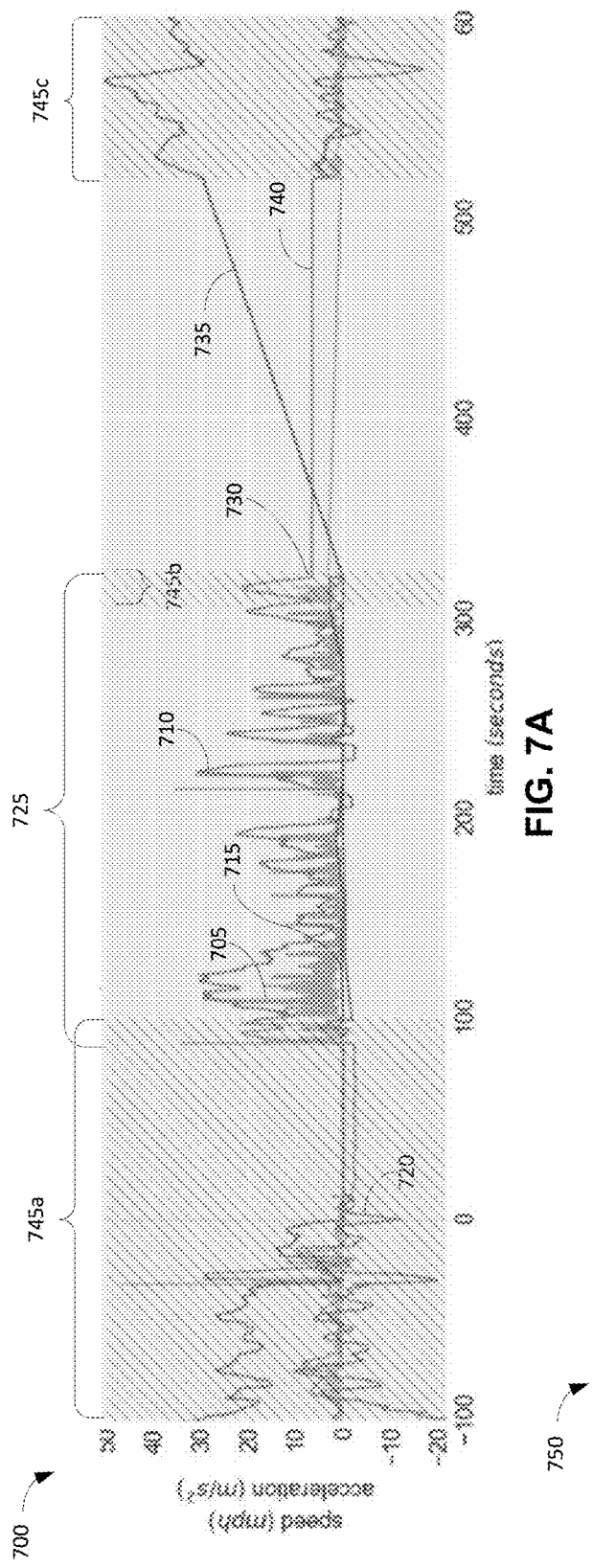
FIG. 7A is a plot illustrating data received via signals from the mobile device in accordance with various aspects of the present disclosure.
Figure 7B:
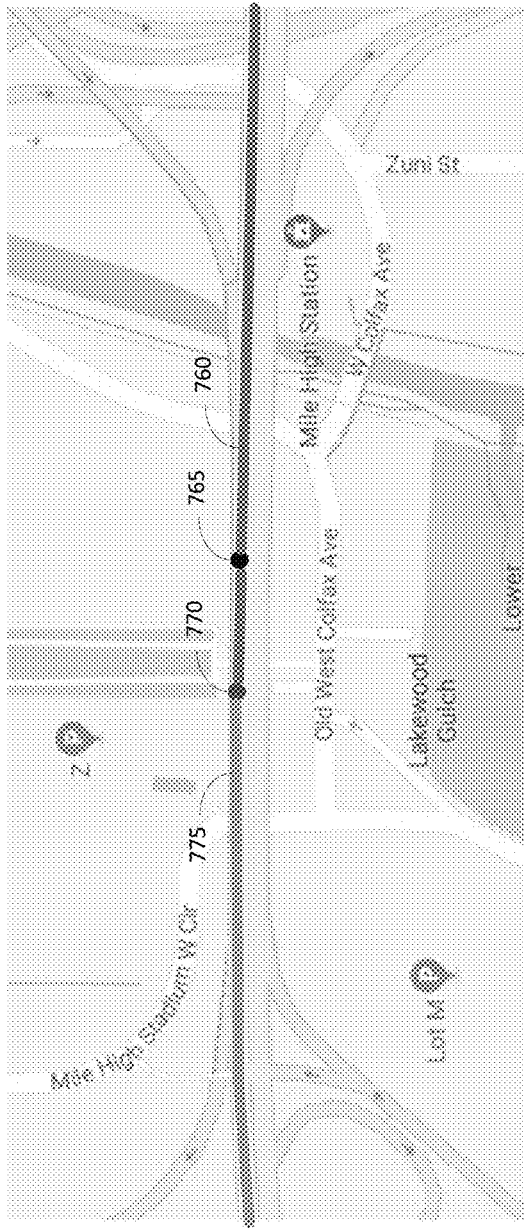
FIG. 7B illustrates map information corresponding to the plot of FIG. 7B in accordance with various aspects of the present disclosure.

FIG. 7A is a plot 700 illustrating data received via signals from the mobile device (e.g., the mobile device 101). FIG. 7B illustrates corresponding map information 750 (e.g., map information provided by a third party). The plot 700 and the map information 750 may be displayed on a display of the mobile device 101 and/or transmitted to and displayed on a graphical interface of a server (e.g., the graphical user interface 292 of the server 201).

Referring to FIG. 7A, the plot 700 displays acceleration data 705 from the accelerometer of the mobile device 101, processed acceleration data 710 for example, but not limited to, a rolling average of the acceleration data 705 from the accelerometer 112 of the mobile device 101, GPS speed data 715 received by the GPS receiver 110, and derived acceleration 720 from the GPS speed data 750. One of ordinary skill in the art will appreciate that while not shown, other data plots may be provided without departing from the scope of the present disclosure. FIG. 7A also indicates portions of time 745a, 745b, 745c when the screen of the mobile device 101 is unlocked. Various aspects of the present disclosure may include detection of passive usage of the mobile device 101 (e.g., playing music), active usage of the mobile device (e.g., texting), and/or making phone calls either with the mobile device in hand or in hands-free mode.

FIG. 7A illustrates that from the time point labeled zero until approximately 90 seconds the plot of the GPS speed data 715 registers approximately zero mph indicating that the mobile device 101 (and the vehicle in which the mobile device was traveling) is not moving. From approximately 90 seconds until approximately 320 seconds the plot of the GPS speed data 715 remains at or near zero mph while the acceleration data 705 from the accelerometer of the mobile device 101 and processed acceleration data 710 indicates irregular changes in acceleration. The irregular changes in acceleration indicate that the occupant has exited the vehicle and is walking around, for example, to survey the damage to the vehicle, exchange information with another driver, etc. At approximately 320 seconds, the GPS speed data 715 begins to increase steadily while the acceleration data 705 from the accelerometer of the mobile device 101 and processed acceleration data 710 show a relatively constant acceleration indicating that the vehicle has once again started moving.

In accordance with various aspects of the present disclosure, data collection may stop approximately five minutes after a drive ends, i.e., at point 730 on the plot 700. A drive may be determined to end when the GPS speed data 715 falls to zero or near zero mph. Data collection may resume when the vehicle breaks a predetermined geo-fence around the location at which the vehicle was stopped. Accordingly, the data collection beginning at point 730 on the plot 700 may actually start several minutes or hours subsequent to the five minute time period after the drive ends.

FIG. 7B illustrates map information 750 corresponding to the plot 700 of speed and acceleration data. As illustrated in FIG. 7B, a vehicle may be traveling on a route 760 when an event (e.g., an accident) 765 occurs after which the vehicle comes to a stop 770 on the roadway. While the vehicle is stopped, the speed and acceleration data described with respect to FIG. 7A during the time period from approximately zero seconds until approximately 320 seconds may be collected. For example, while at the stopped location 770, the occupant in possession of the mobile device 101 may exit the vehicle and walk around 725 and place a phone call 745b. The collected data may be displayed on the mobile device 101 and/or may be transmitted to the server 201 for display on the graphical user interface 292. The vehicle may subsequently continue on a route 775. Thus, even without an indication of an acute event, for example a sudden deceleration or impact, an accident event may be identified from the contextual speed and acceleration data patterns combined with the map data indication that the events occurred at a location where they would not typically be expected (e.g., on a roadway).

The processor 122 of the mobile device 101 may perform various determinations, for example, but not limited to, the length of time the vehicle was stopped on the roadway, the location of the vehicle on the roadway, the length of time the occupant in possession of the mobile device 101 walked, whether the occupant placed a call or text message, etc. The processor 122 may also analyze the overall data patterns and map information to determine based on the patterns of the collected data and map information whether an accident occurred. Alternatively or additionally, the mobile device 101 may communicate the collected data and map information via the data transmission block 130 to the server 150 to perform similar analysis and determinations.

Figure 8:
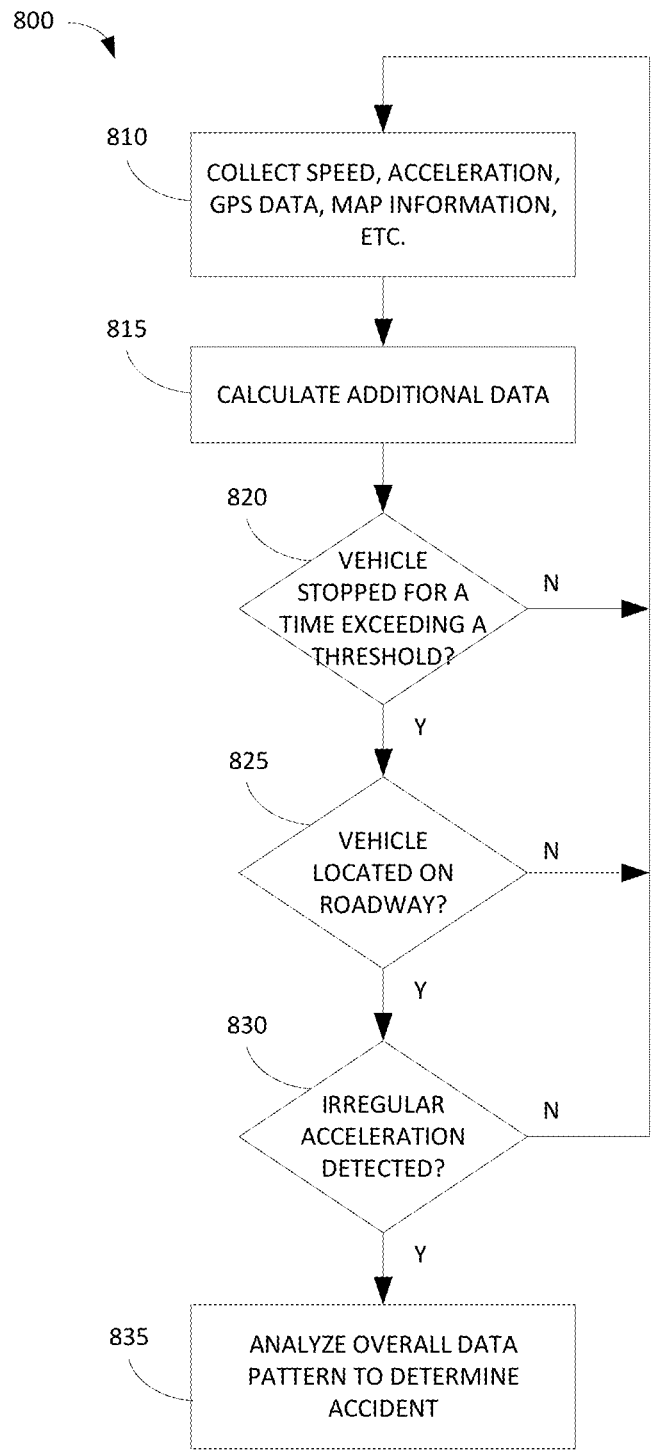
FIG. 8 is a flowchart of a method for detecting a vehicle accident with a mobile communication device disposed in a vehicle in accordance with various aspects of the present disclosure.

FIG. 8 is a flowchart of a method 800 for detecting a vehicle accident with a mobile communication device disposed in a vehicle. At block 810, the mobile device 101 may collect data while the vehicle is on a drive. For example, the mobile device 101 may collect acceleration data 705 from the accelerometer of the mobile device 101, GPS speed data 715 received by the GPS receiver 110, GPS location data, and map information 750, for example but not limited to, Open Street Map (OSM), Google Map APIs, etc. The mobile communication device may also collect data from the gyroscope 116 and/or magnetometer 114. At block 815, mobile device 101 may calculate (e.g., via the processor 122) additional data. For example, the processor may calculate processed acceleration data 710, such as a rolling average of the acceleration data 705 from the accelerometer 112 of the mobile device 101, and derived acceleration 720 from the GPS speed data 750. Data from the gyroscope 116 and/or magnetometer 114 may be used to determine whether the vehicle was spinning. One of ordinary skill in the art will appreciate that other data may be derived from the collected data and information without departing from the scope of the present disclosure.

At block 820, the processor 122 of the mobile device 101 may determine whether the vehicle is stopped for a predetermined period of time. For example, the processor 122 may determine that the GPS speed data 715 is zero mph or near zero mph for a time that exceeds a threshold period of time (e.g., 10 minutes or another period of time). In response to determining that the vehicle is not stopped for a time that exceeds the threshold period of time (820-N), the process returns to block 810 to collect data.

In response to determining that the vehicle is stopped for a time that exceeds the threshold period of time (820-Y), at block 825 the processor 122 may determine whether map information indicates the vehicle is on a roadway. For example, map information obtained from a third party source may indicate whether the vehicle is located on a roadway or in a parking lot. In response to determining that the vehicle is not on a roadway (825-N), the process returns to block 810 to collect data.

In response to determining that the vehicle is on a roadway (825-Y), at block 830 the processor 122 may determine whether irregular changes in acceleration are detected. The processor 122 may process the acceleration data 705 received from the accelerometer of the mobile device 101 (e.g., to obtain processed acceleration data 710) and may determine based on the acceleration data 705 and/or processed acceleration data 710 that the occupant is walking around for some time period at the vehicle location. In response to determining that irregular changes in acceleration are not detected (825-N), the process returns to block 810 to collect data.

In response to determining that irregular changes in acceleration are detected (830-Y), at block 835 the processor 122 may analyze the overall data pattern and map information to determine whether an accident occurred. For example, a data pattern such as illustrated in FIG. 7A (i.e., GPS speed data at or close to zero mph for a time that exceeds the threshold period of time and irregular acceleration data at the same location indicating an occupant walking) coupled with map information indicating that the vehicle is stopped on a roadway (as illustrated in FIG. 7B) may indicate that an accident occurred. Other collected data, such as whether a phone call or text message was placed after the vehicle stopped and immediately before, during, or immediately after the irregular acceleration was detected, or a subsequent drive to a hospital or body shop may provide further indications that an accident occurred.

In accordance with various aspects of the present disclosure, based on analysis and/or interpretation of the driving data by the mobile device or server, an accident prediction may be made. Further, a level of confidence in the accident prediction may be generated.

Figure 9:
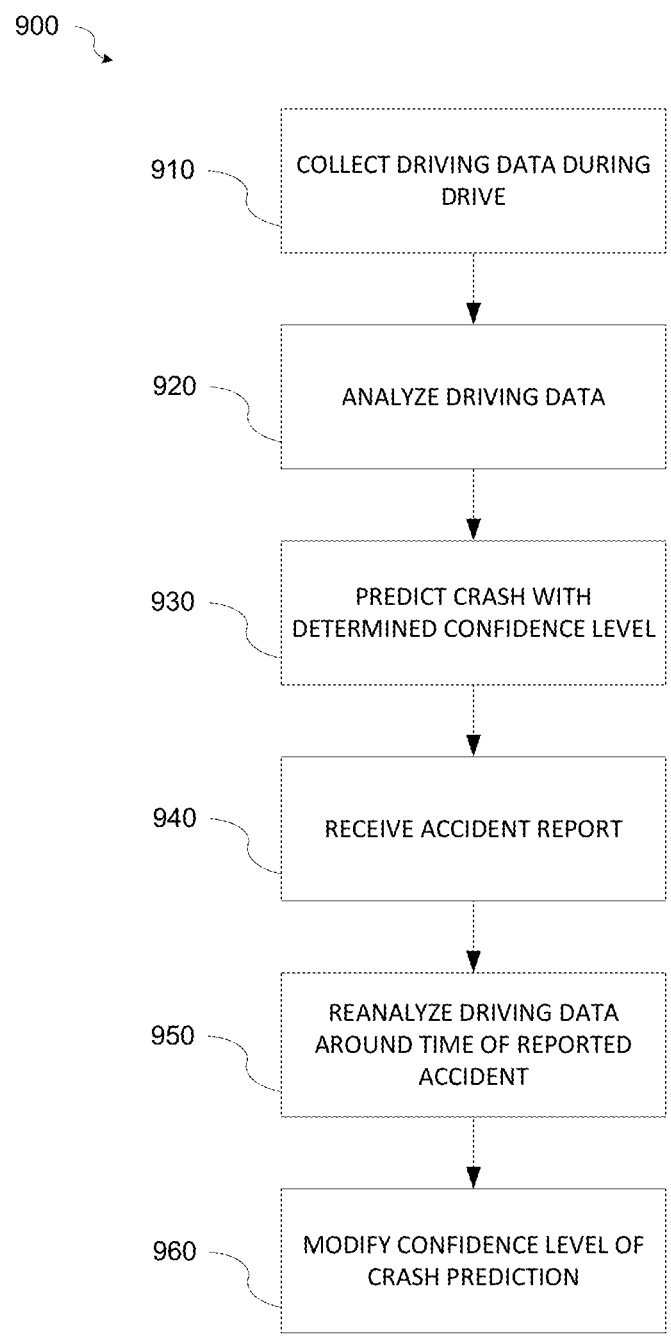
FIG. 9 is a flowchart of a method for assigning a confidence level to a detected event in accordance with various aspects of the present disclosure.

FIG. 9 is a flowchart of a method for assigning a confidence level to a detected event in accordance with various aspects of the present disclosure. Referring to FIG. 9, at block 910 driving data may be collected during a drive. For example, data from the sensors in the mobile device as well as contextual data, for example, but not limited to GPS data, weather data, traffic data, etc., may be collected. At block 920, the driving data may be analyzed. In some embodiments, the driving data may be analyzed by the mobile device (e.g., by the processor 122 of the mobile device 101). Alternatively, the driving data may be transmitted to a server and analyzed at the server (e.g., by a processor in the server 150). The mobile device and/or the server may analyze and/or interpret the sensor data and contextual data to determine whether a crash occurred during the drive.

At block 930, a prediction may be made as to whether a crash occurred during a drive. Based on the analysis and/or interpretation of the driving data, the mobile device or server may predict whether a crash has occurred. The prediction may include a confidence level. For example, GPS and accelerometer data may indicate that a vehicle traveled at a moderate rate of speed, at a specific time experienced an abrupt deceleration, and came to a complete stop on a roadway. The mobile device or server may analyze the driving data and interpret the driving data to predict that a crash occurred at a certain time and location with a high confidence level. In another example, the driving data may indicate that at a specific time the vehicle spun around several times (e.g., hit a patch of ice) while traveling along a road and experienced a rapid, but perhaps not abrupt, deceleration and came to a stop at a side of the road. The mobile device or server may analyze the driving data and interpret the data to predict that a crash occurred at a certain time and location, but with a low confidence level since an abrupt deceleration and stop were not detected. The mobile device or server may generate a report based on the analysis and interpretation of the driving data. The report may include the confidence level of the accident prediction.

At block 940, an accident report may be received. For example, an insurance company may receive a call from a driver reporting an accident and may enter the report data into the system. Alternatively, the driver may submit a report via an app on the mobile device or the report may be automatically generated and submitted by the mobile device based on the detection or prediction that a crash occurred.

At block 950, the driving data may be reanalyzed based on the reported time of the accident report. For example, when the accident report is submitted based on a telephone call to the insurance company or is submitted by the driver via an app on the mobile device, driving data collected around the reported time of the accident may be reanalyzed to more accurately determine the circumstances surrounding the accident. The mobile device or server may reanalyze and/or reinterpret the driving data within a time range of five minutes before and five minutes after the reported time of the accident. One of ordinary skill in the art will appreciate that another time range may be used without departing from the scope of the present disclosure.

At block 960, the confidence level of the accident prediction may be modified. Based on the reanalysis of the driving data with the additional input of the accident report, the mobile device or server may reinterpret the driving data to predict a more precise time and location of the accident with a higher confidence level.

In accordance with various aspects of the present disclosure, claims may be automatically "triaged" based on the type and/or severity of the accident. Different types of insurance adjusters may specialize in the processing of different types of claims. For example, some adjuster may specialize in handling severe bodily injury/hospitalization claims while others may specialize in handling property damage claims. One of ordinary skill in the art will appreciate that this is not an exhaustive list of the types of claims that may be differentiated. When an accident report is generated, the mobile device or server may analyze the accident report and make a determination of which type of adjuster to direct the accident report. In some embodiments, the mobile device or server may determine a type of adjuster to direct the accident report at the initial detection of an accident.

In some embodiments, when an accident report is automatically generated with a high confidence level by the mobile device or the driver submits an accident report having a high confidence level via the app on the mobile device, the server may automatically route the accident report to a particular adjuster for immediate settlement of the particular type of claim. For example, claims related to detected low impact crashes may be directed to one adjuster group based on the analysis and interpretation of the driving data by the mobile device or server for immediate settlement and payment of the claim.

In accordance with various aspects of the present disclosure, previous information regarding driving behavior, for example, but not limited to, previous driving data, previously submitted claims, etc., may be included in the accident report. Inclusion of the previous information may assist in the analysis of an accident report based on consistency or inconsistency of the present driving behavior with past driving behavior to show improvement or decline in driving behavior.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A system, comprising:
a mobile device comprising a plurality of sensors;
a display device;
a memory that stores instructions; and
a processor configured to execute the instructions to:
  operate the plurality of sensors over a plurality of time intervals during a trip in a vehicle to collect driving data;
  detect, using the driving data, a driving event that occurred during the trip;
  in response to the detection of the driving event, cause the mobile device to collect additional data associated with the trip;
  receive the additional data associated with the trip;
  determine that a vehicle accident event occurred during the trip based on the driving data and the additional data; and
  cause the display device to output an indication of the vehicle accident event.

2. The system of claim 1, wherein:
the plurality of sensors include one or more of an accelerometer, a barometer, a gyroscope, a compass, a magnetometer, or a global navigation satellite system receiver.

3. The system of claim 1, wherein the processor is part of the mobile device.

4. The system of claim 1, wherein the processor is coupled to a network.

5. The system of claim 1, wherein causing the mobile device to collect the additional data includes causing the mobile device to:
display instructions prompting a user to provide the additional data associated with the trip; and receive the additional data associated with the trip in response to an interaction by the user with the mobile device prompted by the instructions.

6. The system of claim 5, wherein the processor is further configured to execute the instructions to cause the mobile device to:
  display a plurality of trips;
  receive a selection of the trip from the plurality of trips by the user; and
  thereafter, display the instructions prompting the user to provide the additional data associated with the trip via the mobile device.

7. The system of claim 5, wherein the additional data include at least one of: damage information, weather information, theft information, collision information, breakdown information, road type information, road conditions information, or traffic information.

8. The system of claim 5, wherein the instructions prompt the user to enter information of at least one of: drivers involved in the vehicle accident event, passengers of vehicles involved in the vehicle accident event, or a witness of the vehicle accident event.

9. The system of claim 1, wherein the additional data comprise at least one of: a rolling average of accelerometer data collected by the plurality of sensors, whether the vehicle is spinning, a duration of stopping of the vehicle, whether the vehicle is on a roadway, a pattern of motion data indicative of a vehicle accident event collected by the plurality of sensors, a pattern of motion data indicative of a user of the mobile device getting out of the vehicle or walking collected by the plurality of sensors, or whether a phone call or a text message was placed by the mobile device at a time before or after the driving event.

10. The system of claim 9, wherein the processor is configured to execute the instructions to determine that the vehicle accident event occurred during the trip based on at least one of: detecting the pattern of motion data indicative of a vehicle accident event, or the vehicle is stopped on a roadway for a duration exceeding a threshold.

11. The system of claim 1, wherein the processor is configured to execute the instructions to cause the display device to output at least one of: a time of the vehicle accident event, a location of the vehicle accident event, a severity of the vehicle accident event, environmental and roadway information at the location of the vehicle accident event, the driving data at the time of the vehicle accident event, or a behavior of a driver of the vehicle at the time of the vehicle accident event.

12. The system of claim 11, wherein the processor is configured to execute the instructions to cause the display device to output a map with the location of the vehicle accident event highlighted.

13. The system of claim 1, wherein the processor is configured to execute the instructions to:
  cause the display device to output a plurality of driving events, including the driving event, detected based on the driving data; and
  identify the driving event as the vehicle accident event.

14. The system of claim 13, wherein the processor is configured to execute the instructions to:
  receive a selection of a particular route of the trip or a particular time interval during the trip; and
  cause the display device to display a subset of the driving data and of the plurality of driving events based on the selection.

15. The system of claim 13, wherein the processor is configured to execute the instructions to:
  select a first subset of the driving data and of the plurality of driving events within a first timing window that ends at a first time before the vehicle accident event;
  select a second subset of the driving data and of the plurality of deriving events within a second timing window that starts at a second time after the vehicle accident event; and
  display at least one of a graphical representation or a textual representation of the first subset and the second subset of the driving data and of the plurality of driving events.

16. The system of claim 1, wherein the additional data include an accident report indicating a time and a location of the vehicle accident event; and
  wherein the processor is configured to execute the instructions to:
    select a subset of the driving data of the trip based on the time and the location; and
    determine that the vehicle accident event occurred during the trip based on the subset of the driving data.

17. A computer-implemented method comprising:
  operating a plurality of sensors of a mobile device over a plurality of time intervals during a trip in a vehicle to collect driving data;
  detecting, using the driving data, a driving event that occurred during the trip;
  in response to detecting the driving event, causing the mobile device to collect additional data associated with the trip;
  receiving the additional data associated with the trip;
  determining that a vehicle accident event occurred during the trip based on the driving data and the additional data; and
  causing a display device to output an indication of the vehicle accident event.

18. The method of claim 17, wherein:
  causing the mobile device to collect the additional data associated with the trip includes causing the mobile device to:
    display a plurality of trips;
    receive a selection of the trip from the plurality of trips by a user; and
    thereafter, display instructions prompting the user to provide the additional data associated with the trip; and
  receiving the additional data associated with the trip in response to an interaction by the user with the mobile device prompted by the instructions.

19. The method of claim 17, further comprising:
  causing the display device to output a plurality of driving events, including the driving event, detected based on the driving data; and
  identifying the driving event as the vehicle accident event.

20. The method of claim 17, wherein the additional data include an accident report indicating a time and a location of the vehicle accident event; and
  wherein the method further comprises:
    selecting a subset of the driving data of the trip based on the time and the location; and
    determining that the vehicle accident event occurred during the trip based on the subset of the driving data.

* * * * *